United States Patent
Volpato et al.

(10) Patent No.: US 10,507,492 B2
(45) Date of Patent: Dec. 17, 2019

(54) METHOD, DEVICE AND APPARATUS FOR DISPENSING POLYURETHANE MIXTURES

(71) Applicant: CANNON S.P.A., Milan (IT)

(72) Inventors: Marco Volpato, Milan (IT); Maurizio Corti, Milan (IT)

(73) Assignee: CANNON S.P.A., Milan (IT)

( * ) Notice: Subject to any disclaimer, the term of this patent is extended or adjusted under 35 U.S.C. 154(b) by 291 days.

(21) Appl. No.: 15/229,611

(22) Filed: Aug. 5, 2016

(65) Prior Publication Data

US 2017/0036243 A1 Feb. 9, 2017

(30) Foreign Application Priority Data

Aug. 5, 2015 (IT) .................. 102015000042304

(51) Int. Cl.
| | | |
|---|---|---|
| *B05D 7/00* | (2006.01) | |
| *B05C 5/02* | (2006.01) | |
| *B29C 39/16* | (2006.01) | |
| *B29C 43/22* | (2006.01) | |
| *B29C 44/46* | (2006.01) | |
| *C09D 175/04* | (2006.01) | |

(Continued)

(52) U.S. Cl.
CPC .............. *B05D 7/50* (2013.01); *B05C 5/0254* (2013.01); *B05C 5/0258* (2013.01); *B29C 39/16* (2013.01); *B29C 43/22* (2013.01); *B29C 44/461* (2013.01); *B29C 48/2566* (2019.02); *B29C 48/30* (2019.02); *B29C 48/305* (2019.02); *C09D 175/04* (2013.01); *B29C 44/306* (2013.01); *B29C 48/08* (2019.02); *B29K 2075/00* (2013.01); *B29K 2105/04* (2013.01); *B29L 2031/776* (2013.01)

(58) Field of Classification Search
None
See application file for complete search history.

(56) References Cited

U.S. PATENT DOCUMENTS

| | | |
|---|---|---|
| 2,774,106 A | 12/1956 | Bethe |
| 4,201,534 A | 5/1980 | Phipps |

(Continued)

FOREIGN PATENT DOCUMENTS

| | | |
|---|---|---|
| BE | 703445 A | 2/1968 |
| EP | 0 117 641 A2 | 9/1984 |

(Continued)

*Primary Examiner* — Nathan T Leong
(74) *Attorney, Agent, or Firm* — Buchanan Ingersoll & Rooney PC

(57) ABSTRACT

A method is disclosed for dispensing a polyurethane mixture onto a substrate by generating a liquid mixture from reactive component resins; introducing the mixture in an inlet section of a dispensing device so as to advance it towards a planar-shaped outlet slit section, transversely to the advancement direction of the substrate; distributing the mixture along a gap chamber having a cross section diverging towards the outlet slit section; and dispensing the mixture through the outlet slit section, so as to deposit a thin, uniform film onto the substrate. Fractions of the mixture travel equal distances from the inlet section to the outlet slit section, in equal times, maintaining equal average speeds along each section having zones placed all at the same path distance either from the inlet section or from the outlet slit section.

17 Claims, 20 Drawing Sheets

(51) Int. Cl.
  *B29C 48/30*   (2019.01)
  *B29C 48/25*   (2019.01)
  *B29C 48/305*  (2019.01)
  *B29C 44/30*    (2006.01)
  *B29K 75/00*    (2006.01)
  *B29K 105/04*   (2006.01)
  *B29L 31/00*    (2006.01)
  *B29C 48/08*    (2019.01)

(56) References Cited

U.S. PATENT DOCUMENTS

| | | | | |
|---|---|---|---|---|
| 6,103,161 A | * | 8/2000 | Lopez | ................. B29C 47/14 |
| | | | | 264/148 |
| 2004/0096642 A1 | | 5/2004 | Maruyama et al. | |
| 2010/0080900 A1 | | 4/2010 | Geraedts et al. | |

FOREIGN PATENT DOCUMENTS

| | | | |
|---|---|---|---|
| GB | 1179730 A | 1/1970 |
| JP | 57-100032 A | 6/1982 |
| JP | 2007-296646 A | 11/2007 |
| WO | WO 2008/104492 A2 | 9/2008 |

* cited by examiner

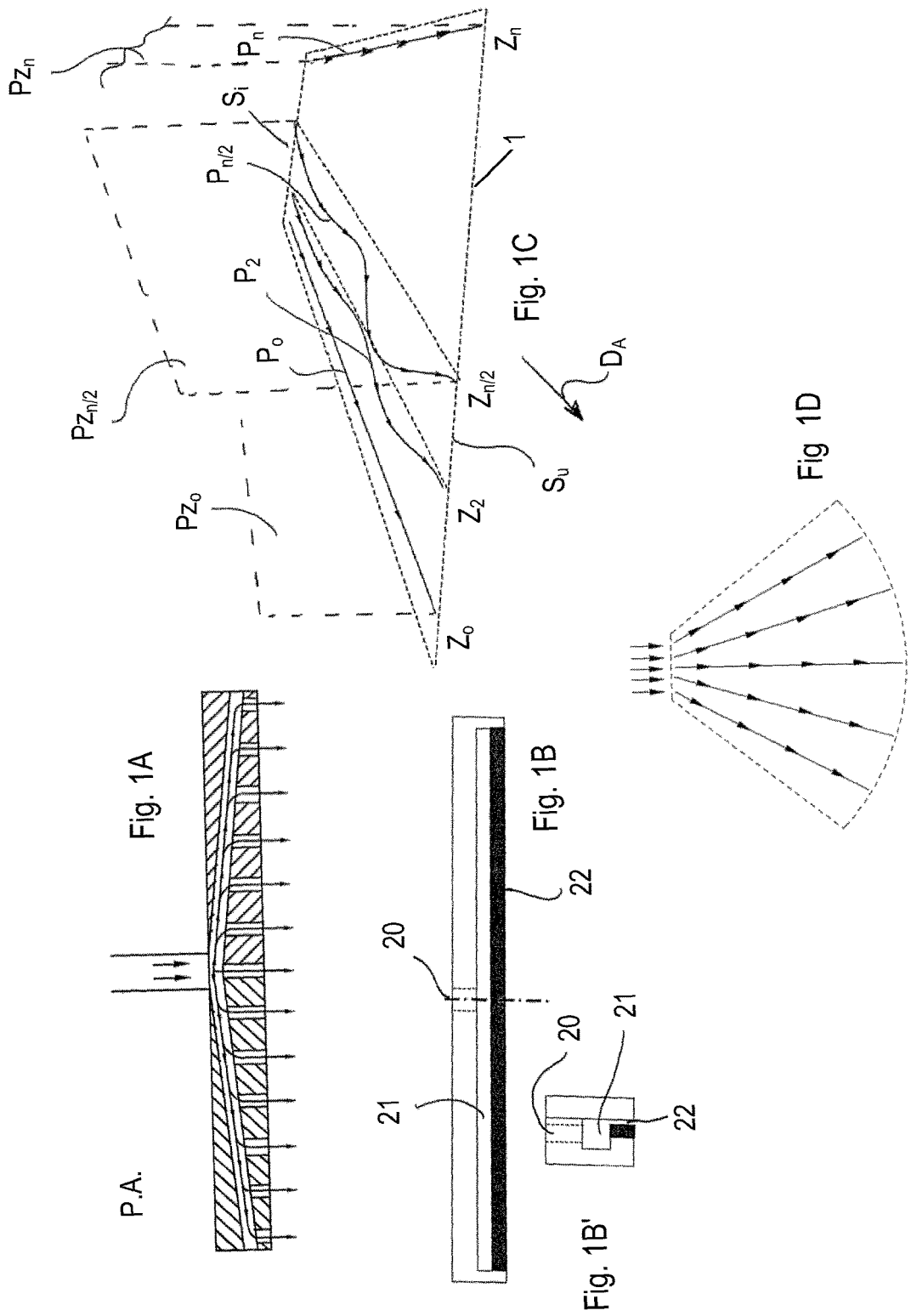

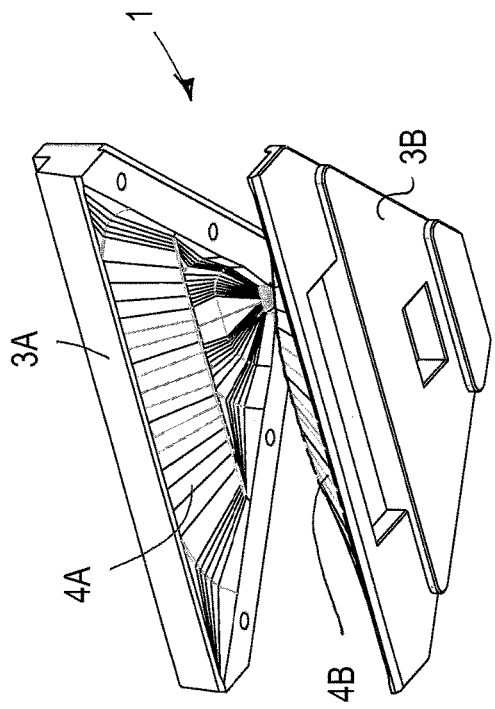
Fig. 6
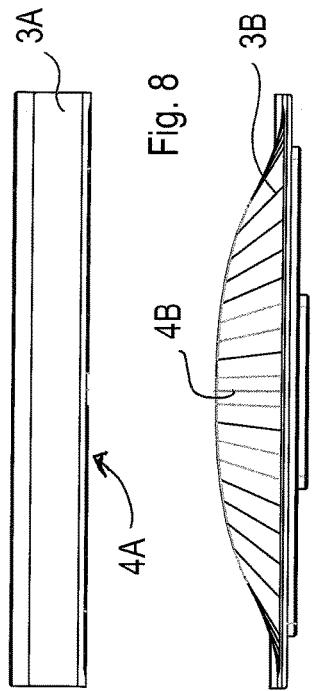
Fig. 8
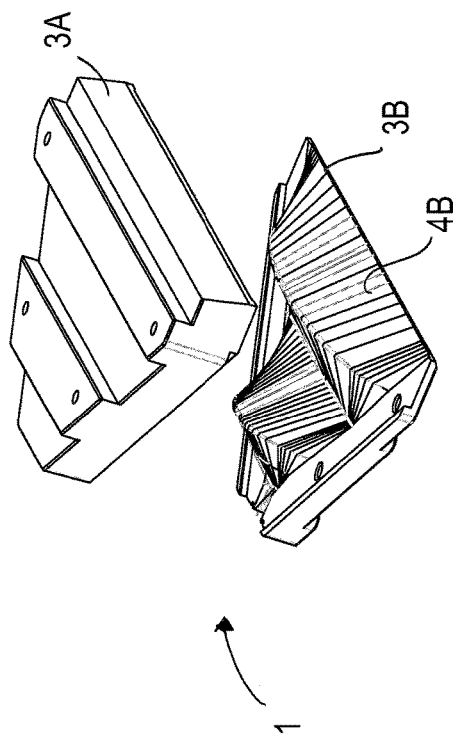
Fig. 5
Fig. 7

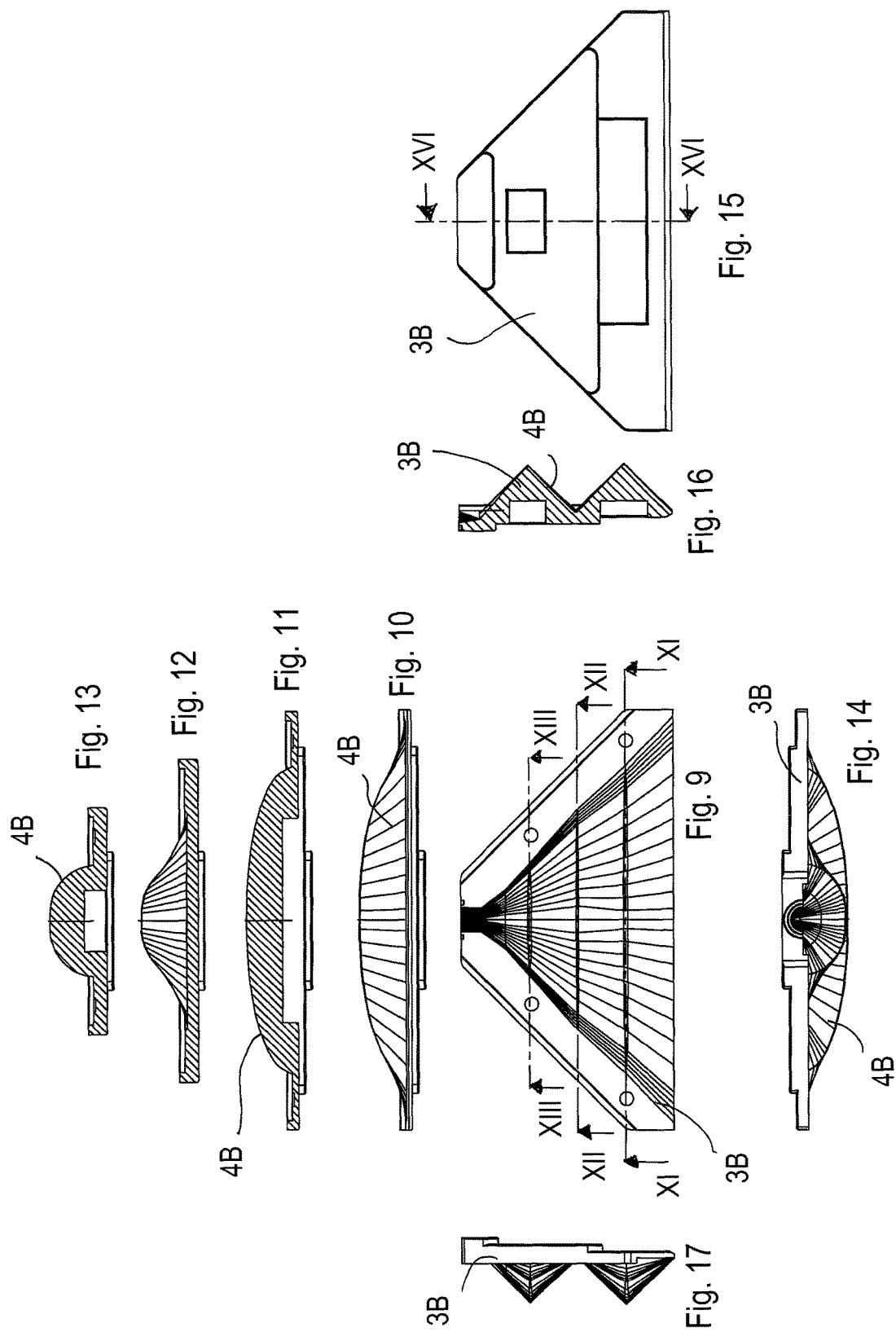

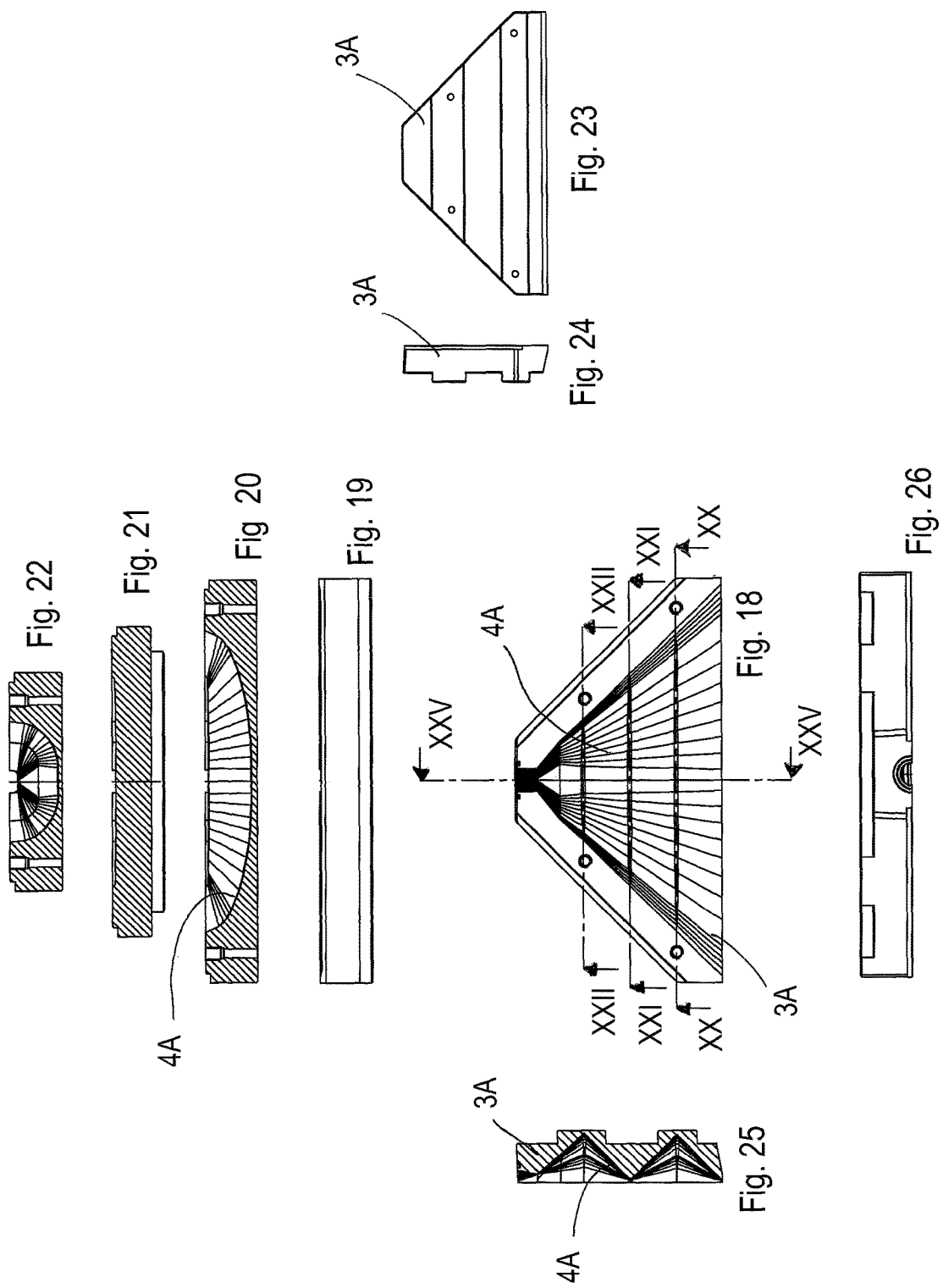

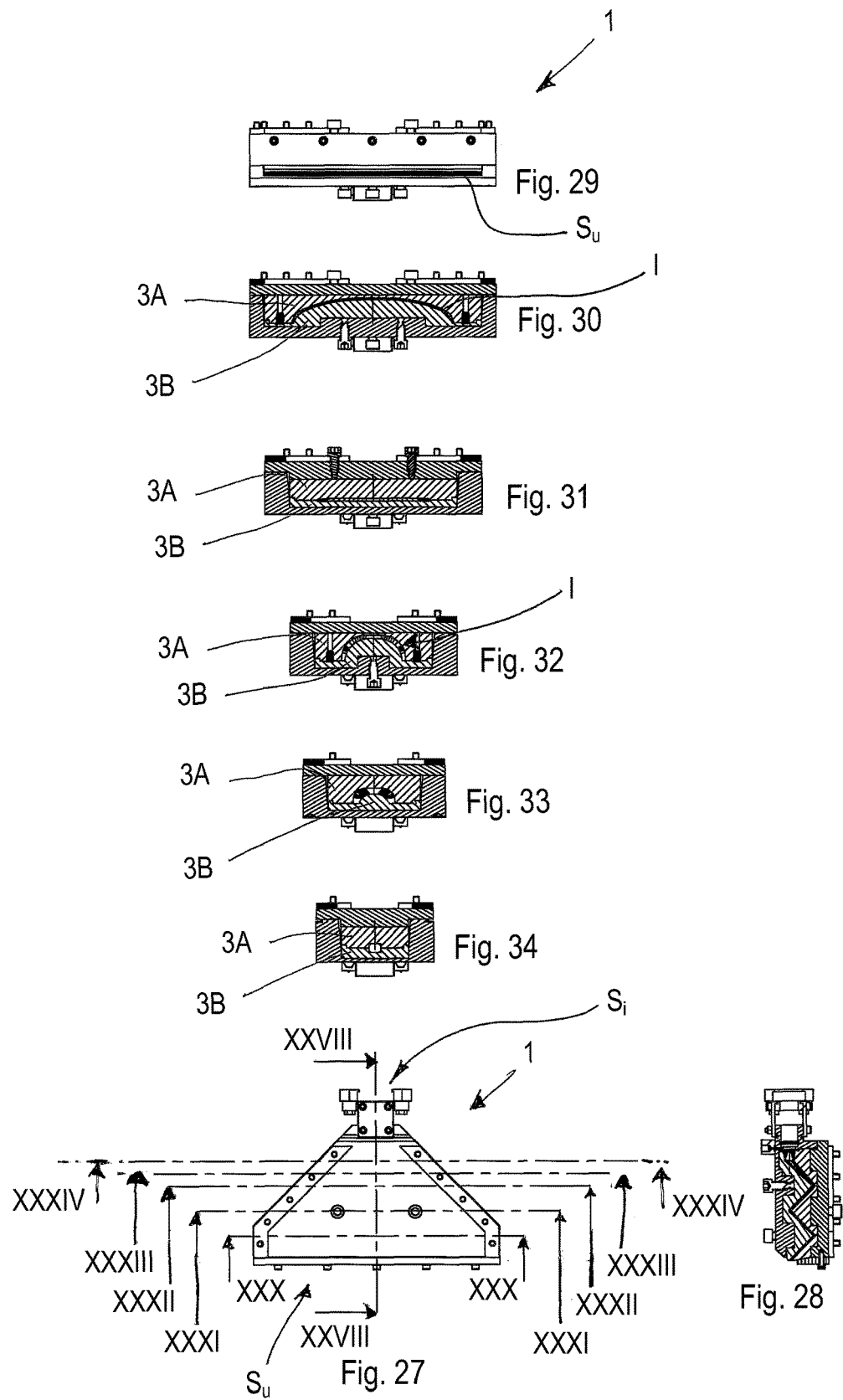

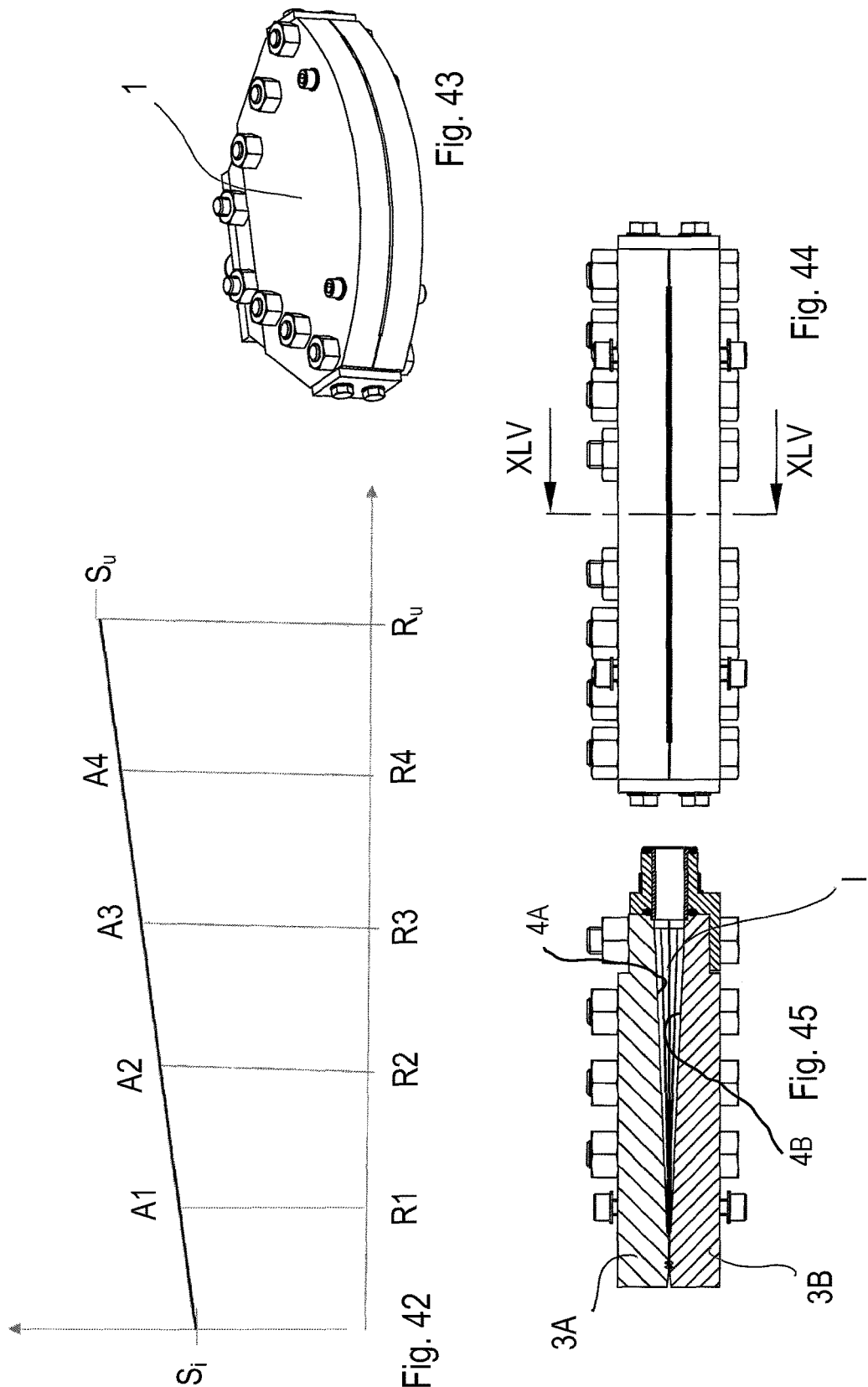

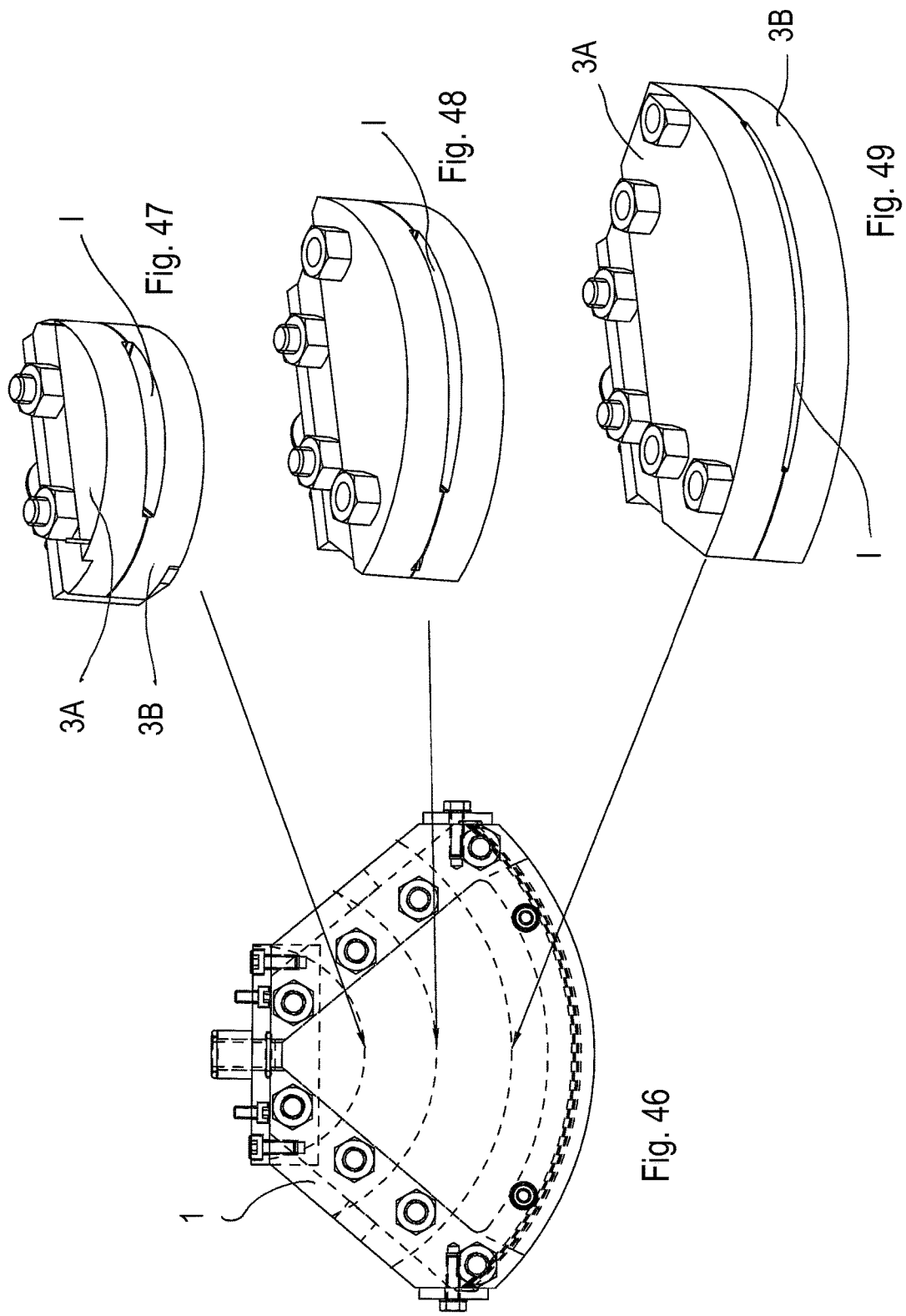

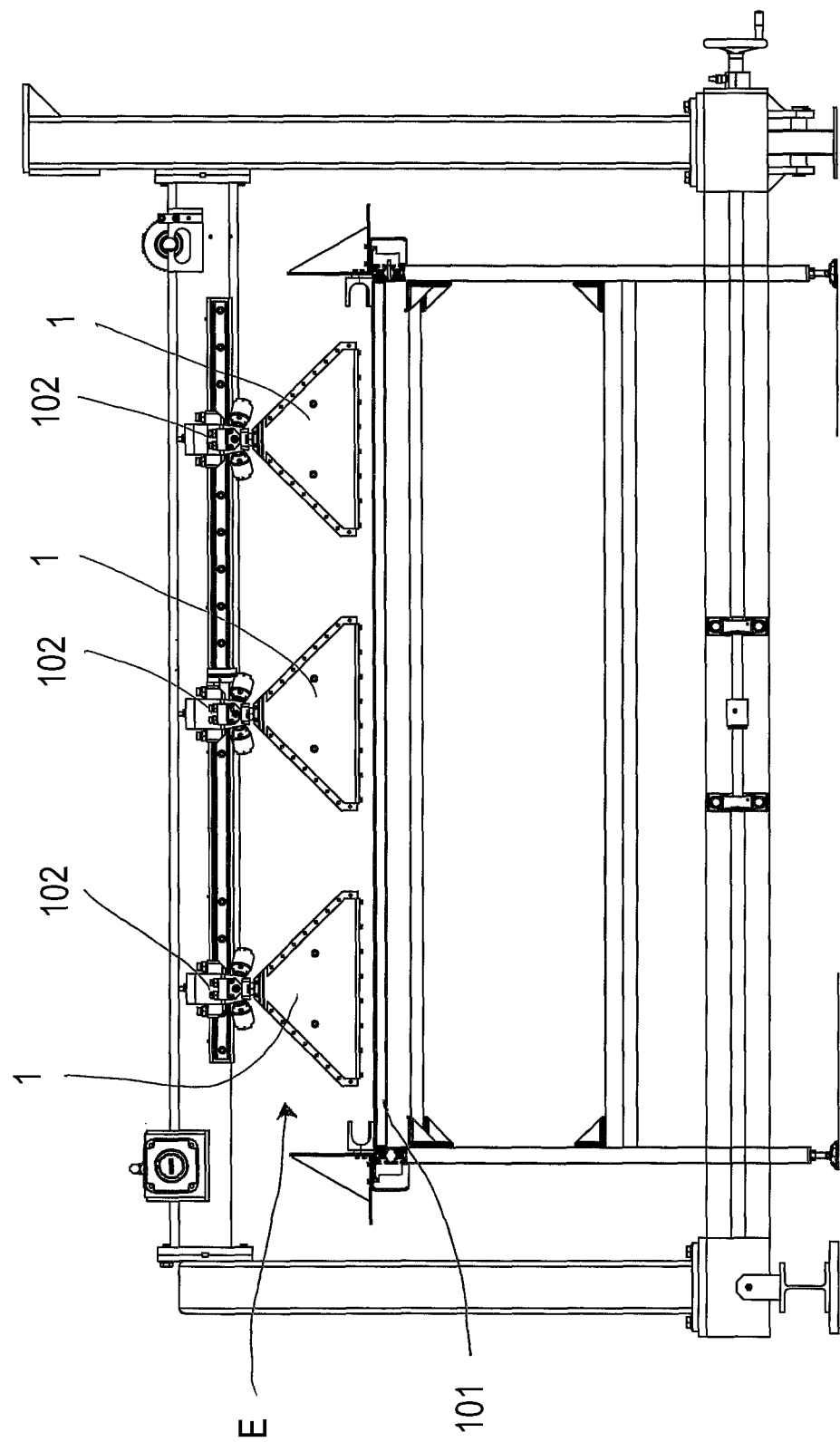

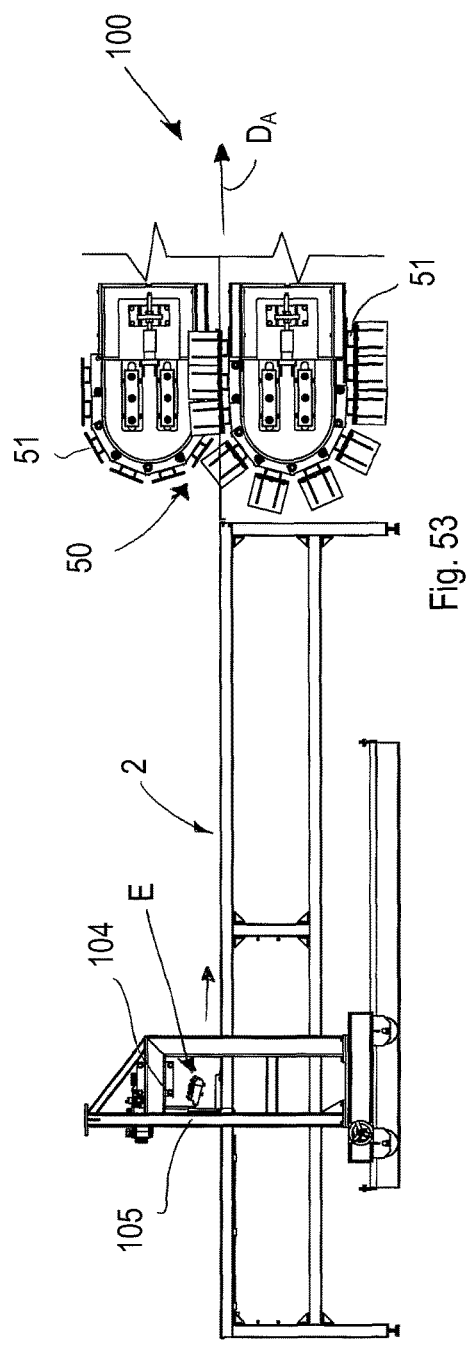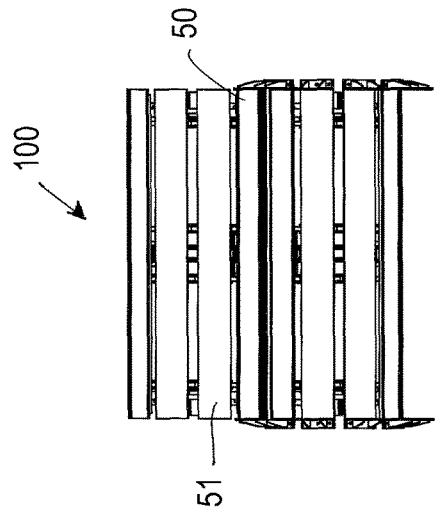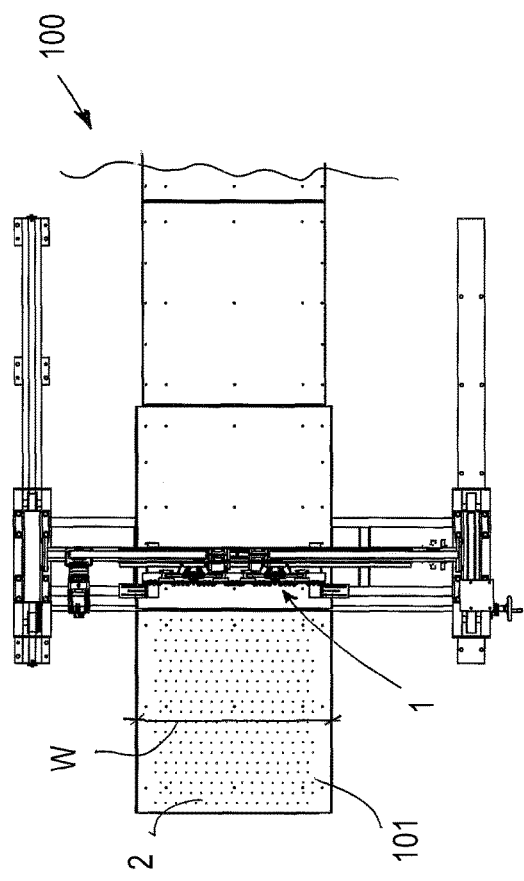

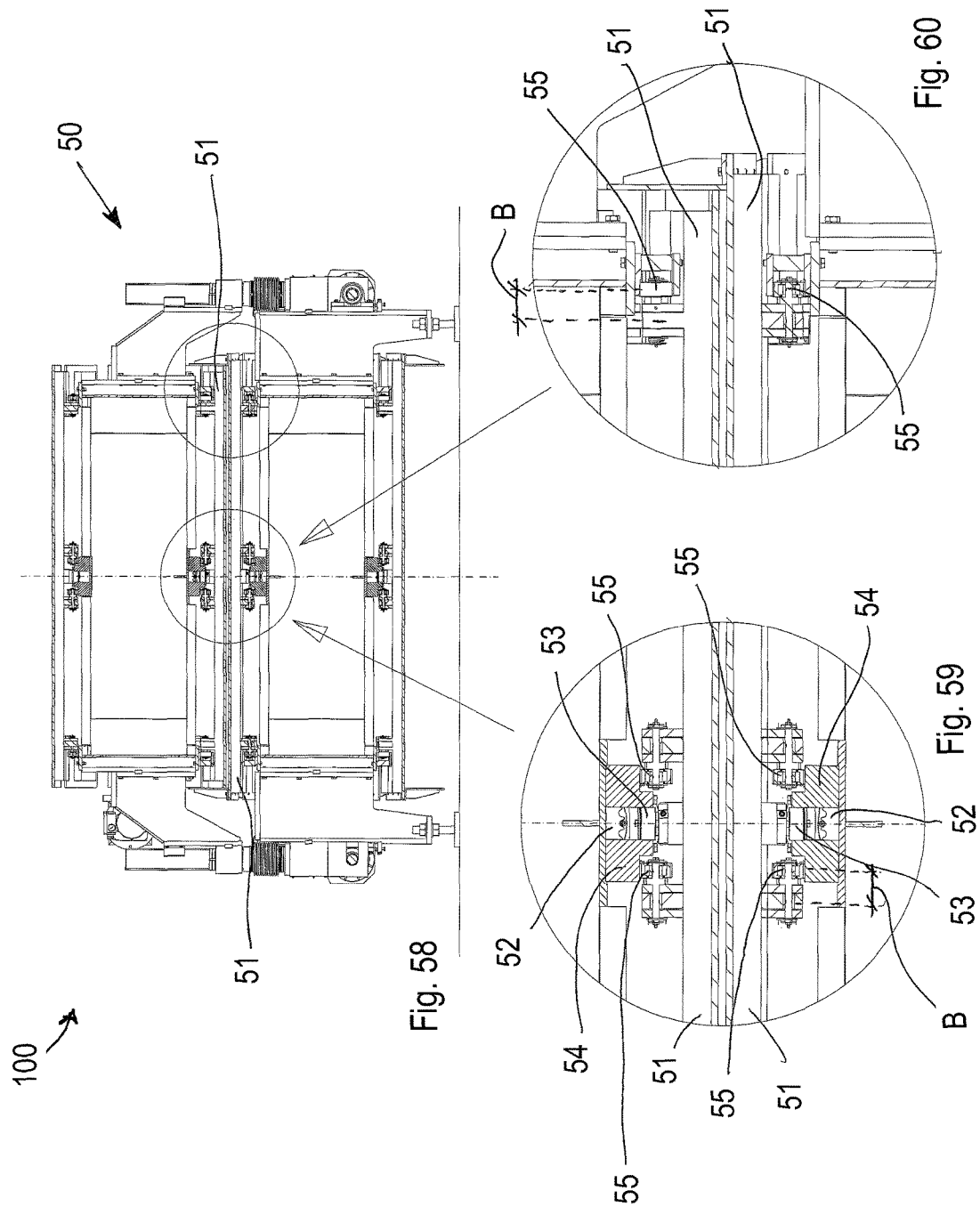

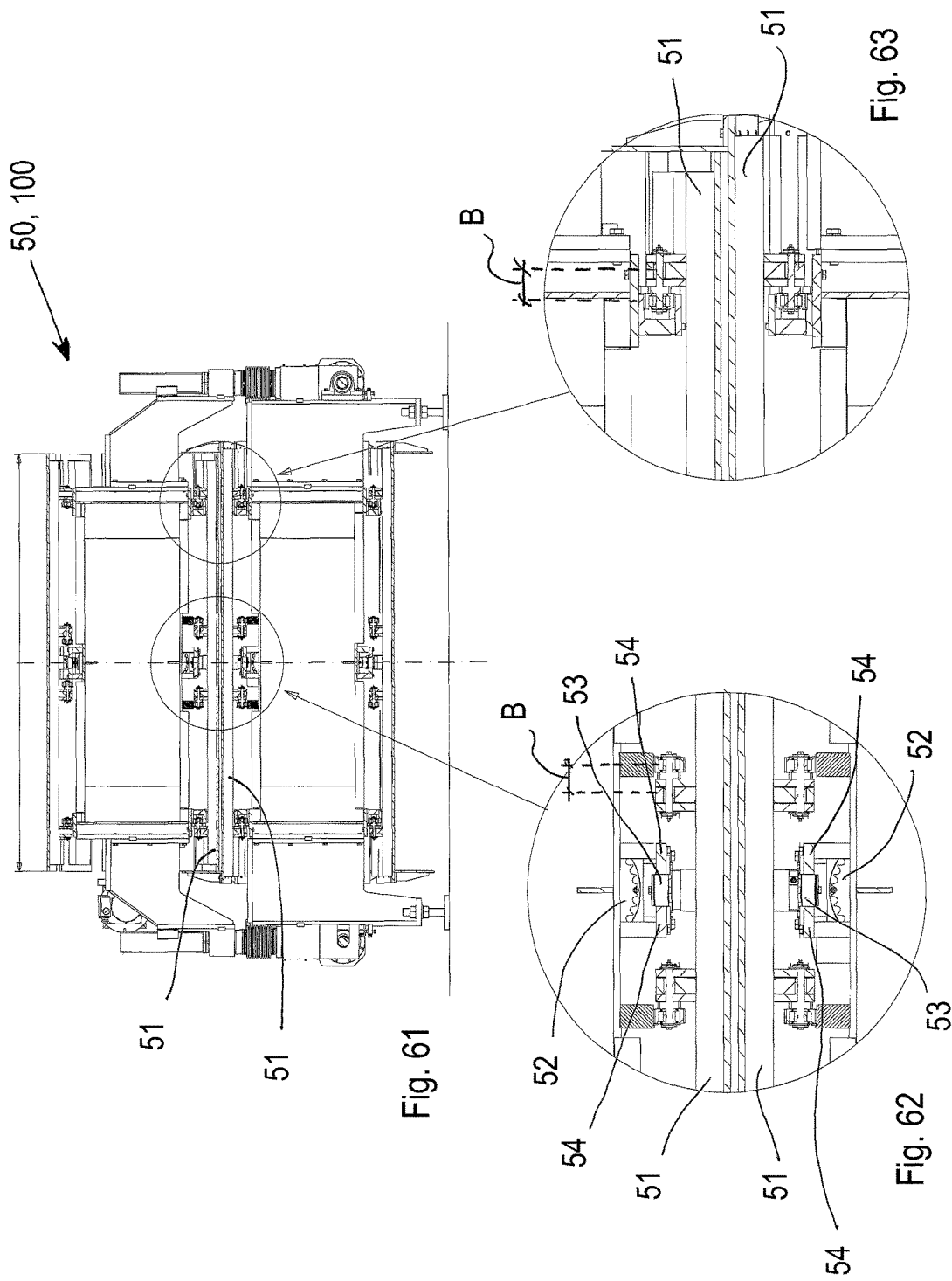

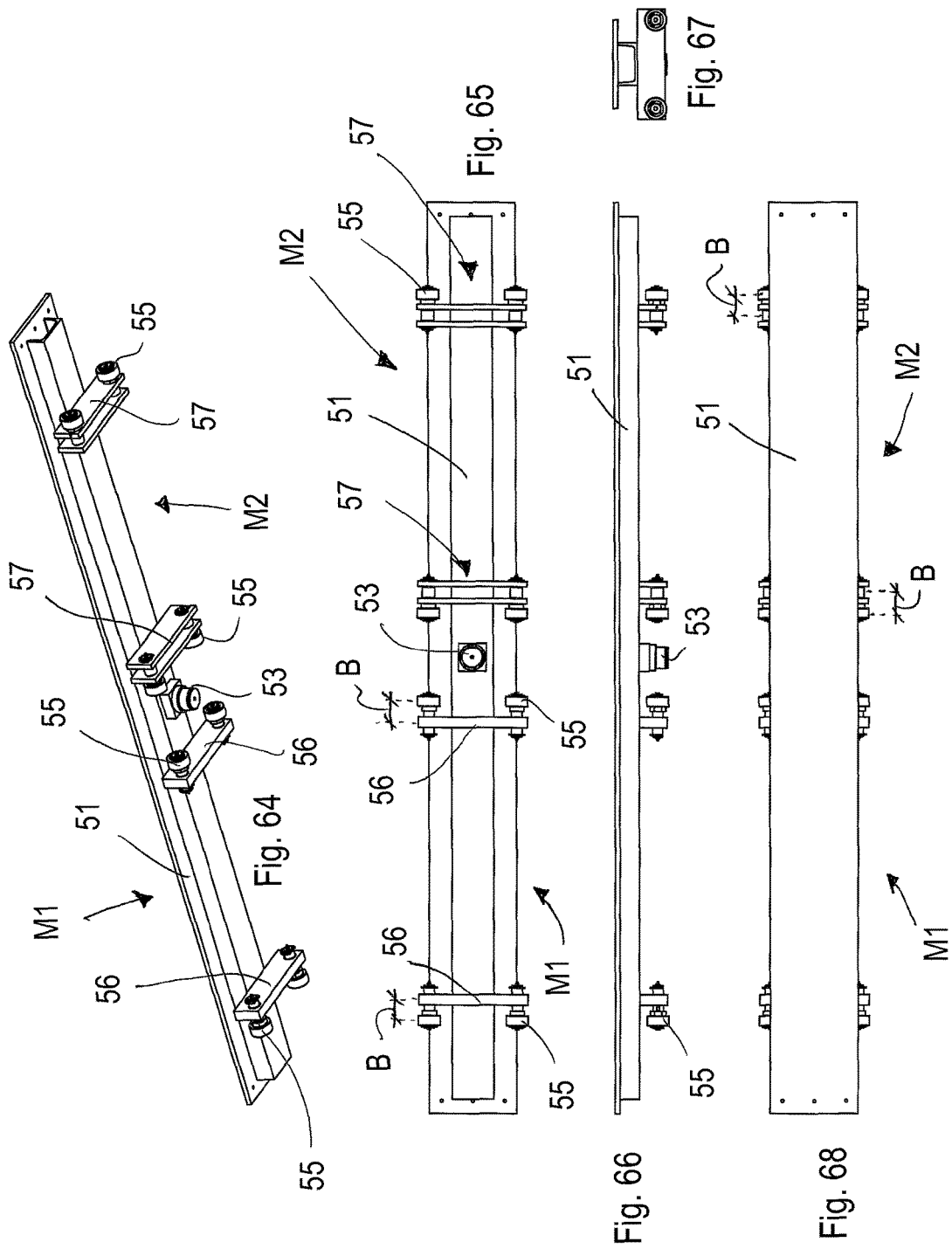

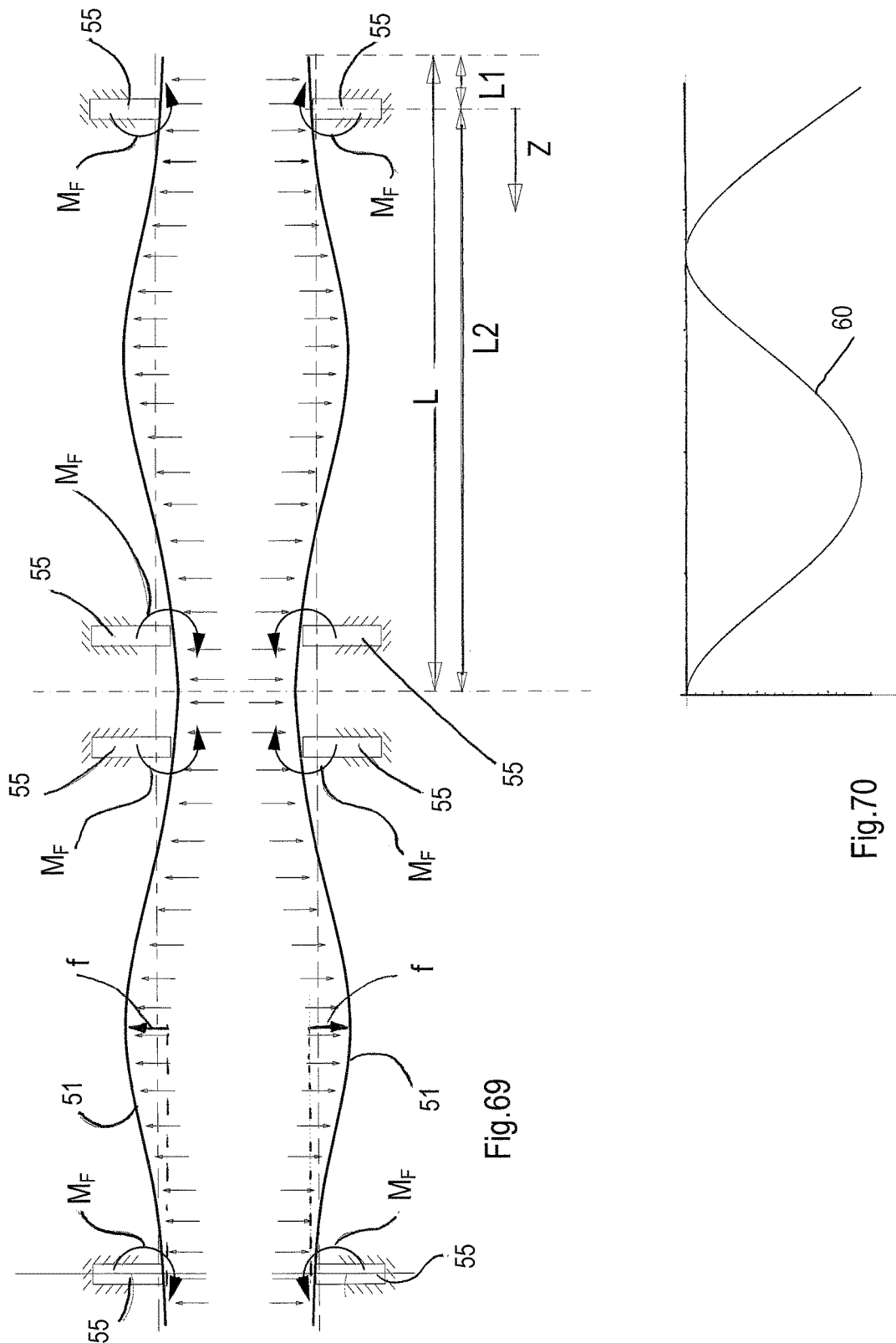

METHOD, DEVICE AND APPARATUS FOR DISPENSING POLYURETHANE MIXTURES

BACKGROUND OF THE INVENTION

The present invention relates to a method, a device and an apparatus for dispensing a mixture of chemical reactive components containing possible expanding agents, for foaming panels or, in general, substantially bi-dimensional objects, i.e., objects having two dimensions prevailing over a third dimension. The invention also relates to an apparatus including one or more pairs of dispensing devices, and to the related system for treating the dispensed flows.

STATE OF THE ART

There are currently known devices for dispensing polyurethane mixtures that receive the mixture just generated from a mixing head and distribute it onto an underlying substrate, e.g., a paper web, that moves onto a conveyor belt. The mixing head provides for the combination of two or more chemically reactive component resins in the liquid state, with the possible addition of additives and/or expanding agents dissolved in solution at ambient pressure or under pressure, and of emulsifying gases and/or solid particles in dispersion, or of nano charges, also called "fillers".

There are known different types of mixture dispensing devices, some of which are shown schematically in FIGS. 1A and 1B.

A known dispensing and distribution device, of the bar type, shown in front and side views in FIGS. 1B and 1B', respectively, includes an inlet opening 20 receiving the resin from a mixing head, a feeding duct 21 (or a number of branched ducts), in which there flows the resin that is distributed along the entrance of a meatus 22 dispensing it with an adequate pressure reduction course, both to handle a possible low-boiling expanding agent and to make the pressure drop along the feeding duct negligible in comparison therewith.

Generally, the dispensing and distribution bar device, hereinafter simply referred to as "bar distributor", is placed orthogonal to the outlet port of the mixing head, the latter generally being placed centrally so as to allow a symmetrical distribution of the reacting resin.

The meatus is a stricture corresponding in length to the length of the bar distributor, and being narrow enough to deliver the flow rate required for the process, and to determine a pressure drop therein, the latter being directly proportional to the flow rate Q of the resin flow and to the viscosity $\mu$ thereof, as well as to the extension length of the meatus b, and being inversely proportional to the third power of the height h of the said meatus and to the longitudinal width l, according to the following relation:

$$\Delta P = (Q \times \mu \times b) \div (h^2 \times l)$$

Triangular cuts may be provided along a central area of the meatus, these serving as turbulators; i.e., acting as rough surfaces that break the material layer adhering to the surface when it is in an almost still position.

This known bar distributor is designed to control the discharge of the reacting resin, especially when a gaseous low-boiling expanding agent is dispersed therein, said agent rapidly evaporating in connection with the pressure reduction along the meatus; thus, there occurs a rapid expansion of the resin in foam form (this phenomenon being referred to as "frothing") that needs be slowed down and controlled by properly adjusting the release of pressure along the meatus.

This functioning principle requires that there be provided very strict dimensional tolerances in the geometric configuration of the bar distributor, a meatus having an adequate extension at the exit end and a height finely adjustable by means of spacers placed along the junction of the two parts composing the bar itself. Furthermore, great care shall be taken of the planarity of the two surfaces delimiting the meatus, as well, as the specific flow rate along the extension of the meatus is inversely proportional to the cube of the meatus' height.

In addition, the bar distributor shall have to be able to withstand the pressure along both the distribution channel and the meatus without deforming. Indeed, deformation would cause some areas to have a wider meatus and other areas to have a narrower meatus, and, as a result, the resin would preferentially flow towards the wider areas, whereas the resin flow towards the areas having a narrower meatus would be inhibited. For this reason, the two parts composing the bar distributor are mutually coupled and tightened by means of a number of quite robust screws, whereby unfortunately said screws make the disassembly operations for periodic cleaning purposes very difficult, as they add the need to perfectly clean both the meatus and the distribution duct, so as to restore the critical surfaces thereof, whereby the carrying out of these operations turns out to take a very long time, leading to expensive operations for replacing and cleaning the bars in the production facilities, these operations resulting in a significant increase in costs.

A serious drawback of the bar distributor described above is the dishomogeneity of the reacting resin flow along the distribution channel supplying the meatus: in the middle section, closer to the mixing head, the flow along the duct is meant to feed not only the meatus in front thereof, but also the remaining meatus extending towards the side ends. For this reason, the flow advances faster in said middle area, whereas the flow rate in the outermost areas is lower; as a result, the mixture arriving to the distal areas takes quite a longer time and is older, since it has traveled longer paths at decreasing speeds, thus taking longer times than the middle areas, as may be easily inferred from FIG. 1B. In this way, the older mixture reacts by becoming more viscous, is replaced more slowly, and more rapidly forms a solidified deposit or layer growing along the walls both of the duct and of the meatus in front thereof (this phenomenon being known as localised "build-up").

Over time, this deposit of solidified material restricts the passage, weakens the flow, extends its residence time in the distribution duct, and finally forms an abrupt occlusion of the bar sections, even of important ones, first in the outermost side areas, and then gradually towards the middle area, too.

This phenomenon features instability aspects, since a mixture flow decrease in a restricted area receiving an increasingly more stale and more viscous reacting mixture coincides with a flow increase in the still non-obstructed area, the latter thus being always kept clean by the flow. All this rapidly leads to having areas of the meatus that are completely occluded and areas that are never occluded, this resulting in an inadmissible dishomogeneity in the distribution of the mixture along the discharge meatus. Along the bar distributor there is also the phenomenon of dishomogeneity in the feeding pressure of the meatus, deriving from the Pitot effect caused by the orthogonal component of the fluid speed. In other words, when there is an attempt to increase the speed along the distribution channel so as to keep it clean as a result of the washing effect, such an increase in speed disturbs the feeding of the meatus by generating a higher depression where the flowing speed is higher. All this has a negative impact on both the homogeneity and the quality of the foamed product.

There is known another device designed as a bar distributor, as schematically outlined in FIG. 1A, (described WO2008/104492, for example), wherein the distributor is fed centrally, and includes a symmetric distribution channel upon which there is arranged a plurality of uniformly spaced, circular-shaped dispensing bores or channels.

The dispensing bores are gradually shorter in length towards the ends. The different lengths of the dispensing bores/channels serve to compensate for the pressure drop along the distribution duct, from the central feeding position to the ends. In this way, the flow exiting from each bore is as similar as possible to those of the other bores. Yet, this distribution device, too, has many drawbacks: it tends to become obstructed, starting from the outermost bores, as they are fed with a foam that is older due to the fact that it has traveled a longer distance compared to the more central areas; furthermore, though the many circular flows exiting from the bores and falling onto the conveyor belt do not splash, they form a plurality of parallel foam cords that subsequently expand and get in contact with one another. The contact areas have multiple defects at each center line between one cord and the other, such as air bubbles trapped onto the surface and collapsed foam cellulation (skin effect) along the surfaces where the cords get in contact with one another when they expand.

When it is necessary to continuously foam objects with a well-distributed flow, especially panels of very large width, whereby it is required to use dispensing devices that are very long as compared to the mixture dispensing section, crucial importance is attached to the problem of avoiding any occlusion of the ducts and/or outlet ports while keeping the distribution along the width substantially uniform. As to the problem of foaming panels of very large width, it is observed that the current dual conveyor systems for foam treatment and shaping, designed with plates or slab members, for the formation of panels, allow to obtain objects whose width cannot exceed a given value, as the current dispensing devices require the use of a plurality of dispensing devices arranged side by side, each of them being fed by a respective dosing and mixing system, and as the forces deriving from the pressure thrust of the expanding resin subject the surfaces of the plate/slab members to a burdensome condition of stress and deformation that would impose a very massive, excessive structural dimensioning of the system, with mechanical and thermal inertiae difficult to handle, and inadmissible production costs. For this reason, the current plate/slab members used in known dual conveyors do not exceed 1260 mm in length (generally, the length is from 1210 mm to 1260 mm), and the width varies from approximately 180 to 250 mm.

Other foaming systems are known from EP0117641 and JPS57100032.

At present, there are known no adequate means to fulfil the aforementioned needs and remedy the above-discussed drawbacks.

OBJECTS OF THE INVENTION

It is an object of the invention to provide a device for dispensing and distributing a polyurethane mixture capable of transforming the mixture flow coming from a mixing head into a very large, highly uniform film to be deposited onto the surface of a sheet-shaped substrate flowing thereunder.

It is another object to enabling the foaming of objects, especially panels, having a length that is much greater, especially double, than the length currently achievable with conventional foaming systems, while maintaining the same number of dispensers currently applied in conventional systems, without exceeding a maximum number of four, by applying a cost-effective technical solution that allows to limit weights, mechanical and thermal inertiae and structural deformations, while ensuring the excellent quality of the product obtained by foaming.

BRIEF DISCLOSURE OF THE INVENTION

These and any other objects may be achieved with an apparatus for foaming a panel according to claim 1, and with a method according to claim 15.

Moreover, the invention also relates to an apparatus for foaming panels, comprising a very limited number—less than or equal to 4—of mixture mixing and dispensing units, each unit having one or a pair of the aforesaid dispensing device(s), each pair being fed in common by a respective mixing head; and a dual conveyor having a plurality of mutually articulated plate or slab members to support and advance a panel progressively obtained through the foaming process, by way of the parallel dispensing of layers arranged side-by-side; the apparatus being suitable for forming insulating panels of double width as compared to the current technology.

Specifically, the plate or slab members comprise:
- bearing means, lying on a vertical plane, protruding to engage with central screw driving means, to be drawn along the advancement direction,
- rail elements extending along the advancement direction, and arranged so as to laterally guide the bearing means, while supporting the thrust of the foam in the central area of the structure,
- wheel thrust means arranged close to a central area and to side zones of each plate or slab member, and designed to act as supports and to counteract the thrust from the expanding foam as well as to limit the deflection of the several sections of each respective plate or slab member to a minimum.

BRIEF DESCRIPTION OF THE DRAWINGS

These and other features of the method and device for dispensing and distributing polyurethane mixtures, and of the apparatus for foaming panels, and the exemplary embodiments, will be further clear by reference to the following specification and appended drawings, in which:

FIG. 1A is a schematic view showing the distribution of polyurethane mixture flows within a state-of-the-art dispensing device;

FIGS. 1B, 1B' are two different views of another state-of-the-art dispensing device;

FIG. 1C is a schematic view representing the distribution and the paths followed by the polyurethane mixture within a dispensing device according to the present invention;

FIG. 1D is a representative scheme of a simplified form of the dispensing device according to the present invention, in which the outlet slit section is arranged along an arc of a circle;

FIGS. 5 and 6 are other perspective views, a top view and a bottom view, respectively, of the pair of upper and lower valve members;

FIGS. 7 and 8 show the two upper and lower valve members in a side view and a front view, respectively;

FIG. 9 is a top view of the lower valve member;

FIG. 10 is a front view of the lower valve member;

FIGS. 11, 12 and 13 show different sections taken along the lines XI-XI, XII-XII, XIII-XIII in FIG. 9, respectively;

FIG. 14 is a rear view of the lower valve member;

FIG. 15 is a bottom view of the lower valve member;

FIG. 16 is a sectional view taken along the plane XVI-XVI in FIG. 15;

FIG. 17 is a right-side view of the lower valve member in FIG. 9;

FIG. 18 is a bottom view of the upper valve member;

FIG. 19 is a front view of the upper valve member;

FIGS. 20, 21 and 22 show different cross sections taken along the lines XX-XX, XXI-XXI e XXII-XXII in FIG. 18;

FIG. 23 is a top view of the upper valve member;

FIG. 24 is a side view of the upper valve member;

FIG. 25 is a sectional view taken along the line XXV-XXV in FIG. 18;

FIG. 26 is a rear view of the upper valve member;

FIG. 27 is a top view of the dispensing device in its entirety;

FIG. 28 is a cross section taken along the line XXVIII-XXVIII in FIG. 27;

FIG. 29 is a front view of the dispensing device;

Figure 35:
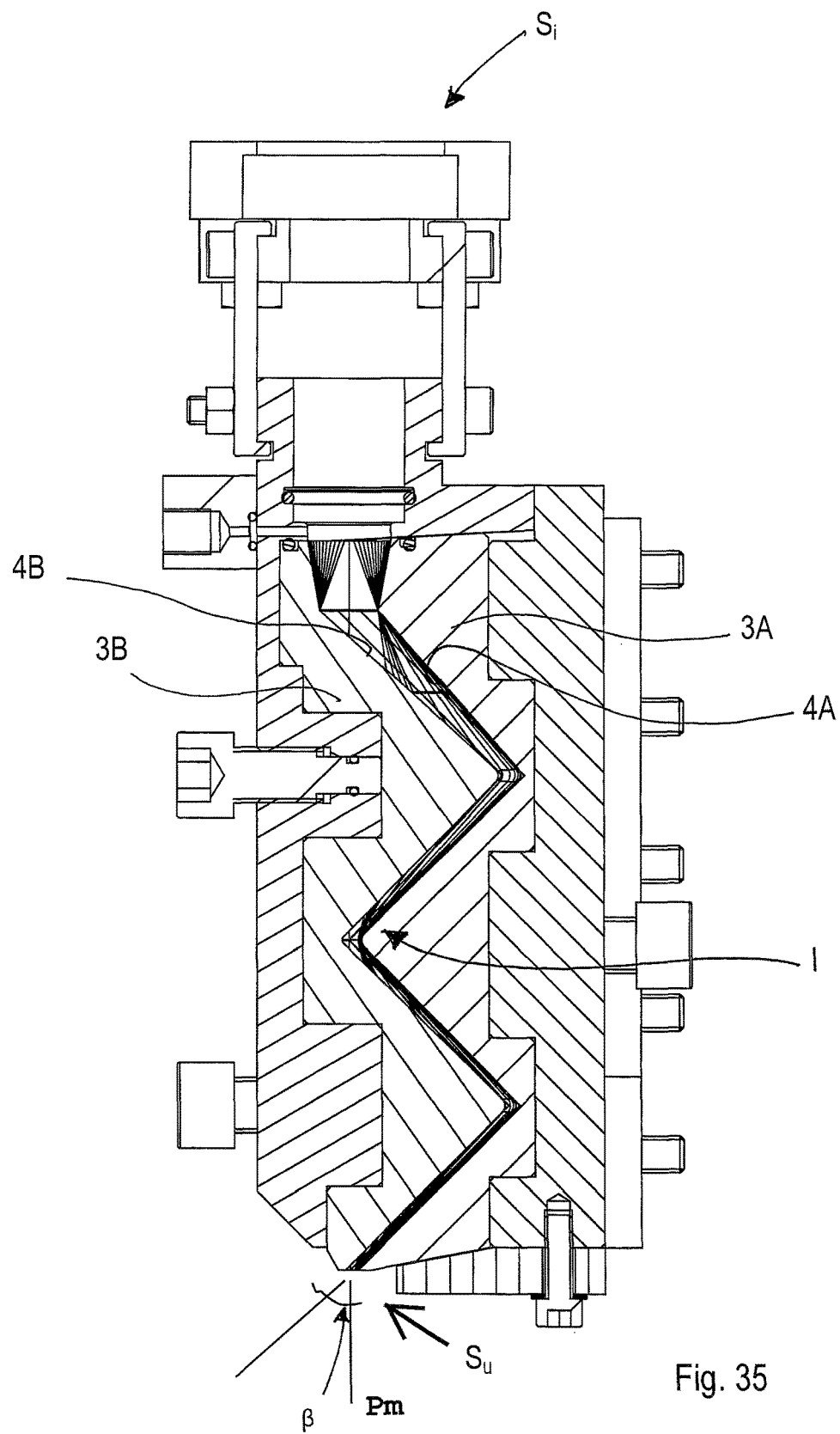
Figure 36:
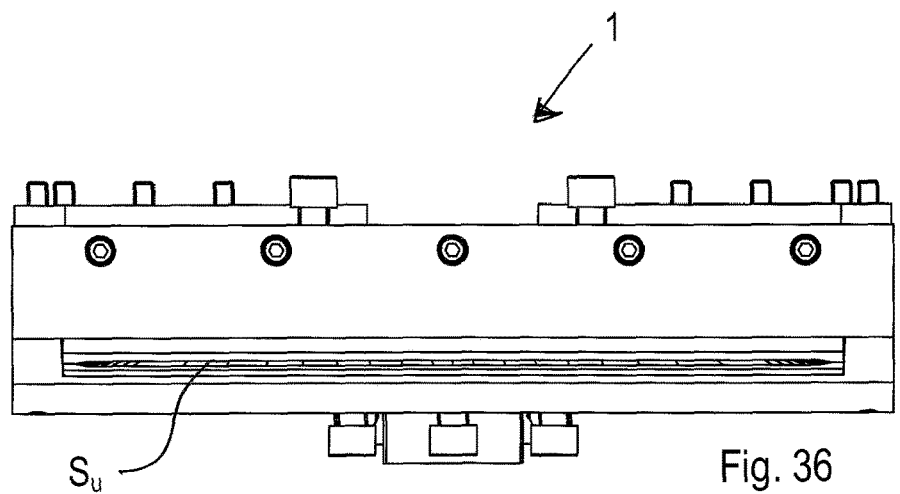
Figure 37:
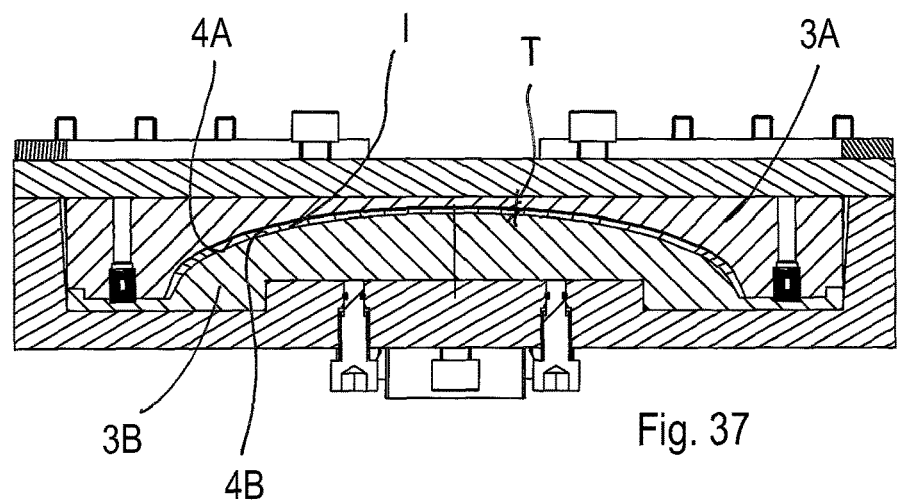
Figure 38:
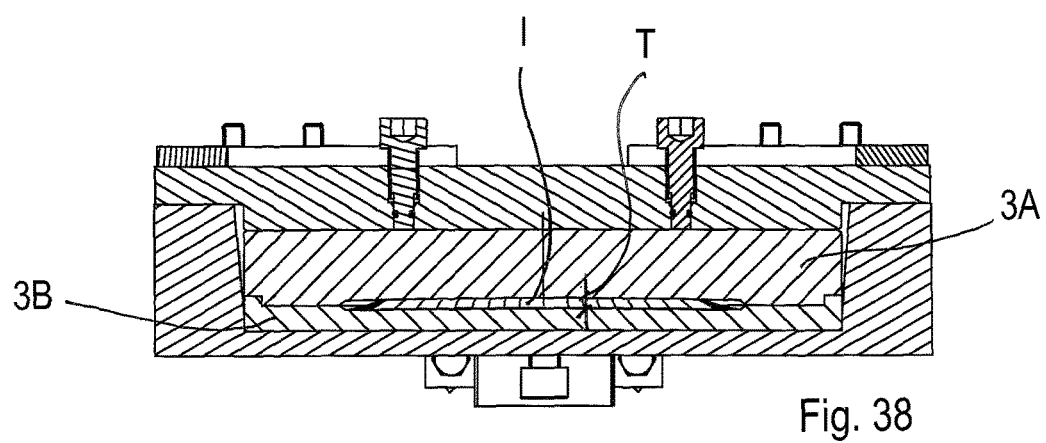
Figure 39:
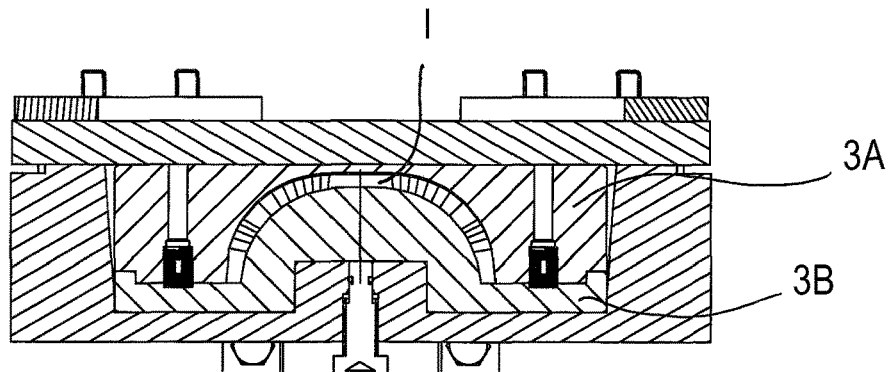
Figure 40:
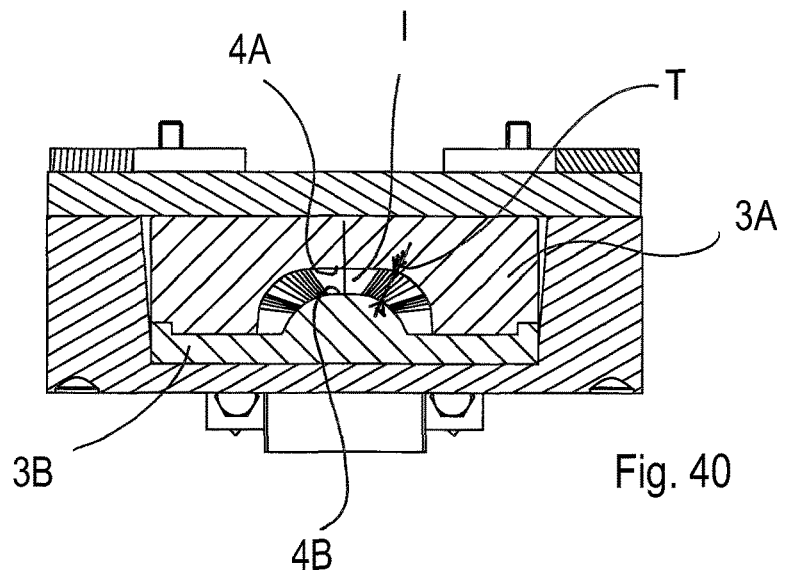
Figure 41:
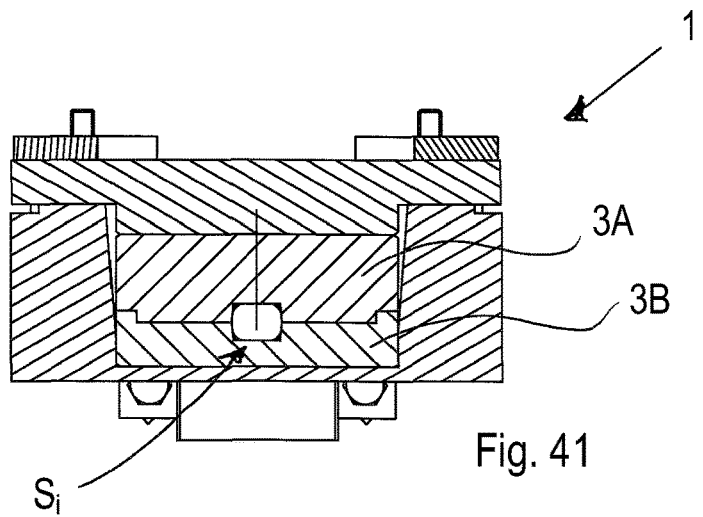

Figures from 30 to 34 are different cross sections taken along the lines XXX-XXX, XXXI-XXXI, XXXII-XXXII, XXXIII-XXXIII and XXXIV-XXXIV, respectively;

FIG. 35 show an enlarged part of FIG. 28;

Figures from 36 to 41 show enlarged parts of the Figures from 29 to 34;

FIG. 42 is a graph illustrating how the area comprising the total sections for the passage of the resin may vary linearly depending on the distance from the entrance, along the paths radiating between the inlet section and the outlet slit section of the dispensing device according to the invention.

Figure 50:
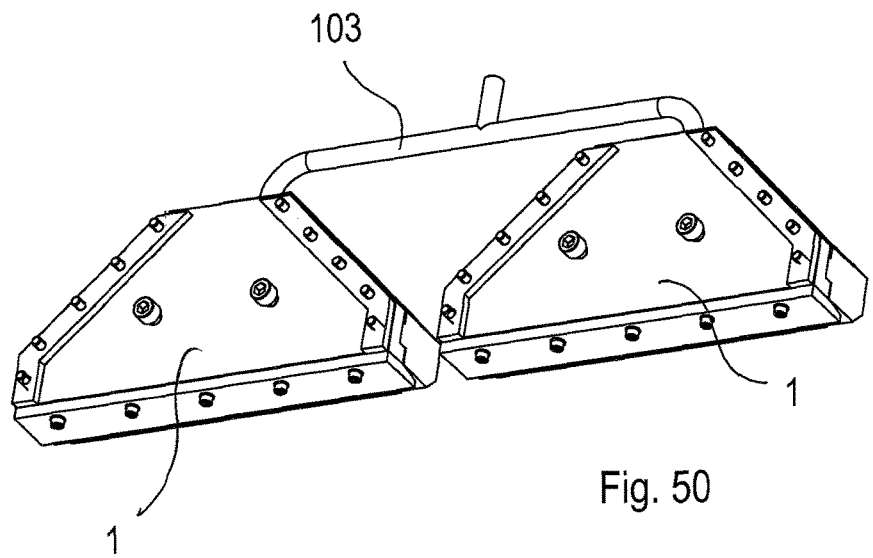
Figure 51:
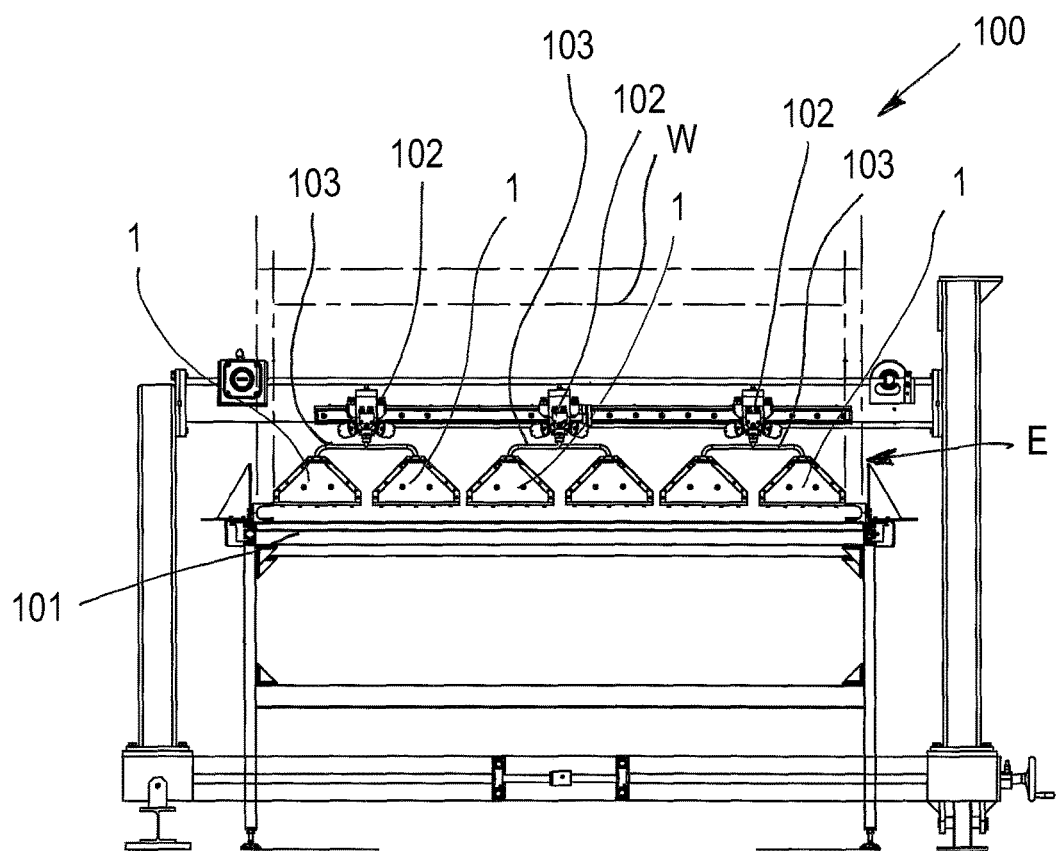
Figure 57:
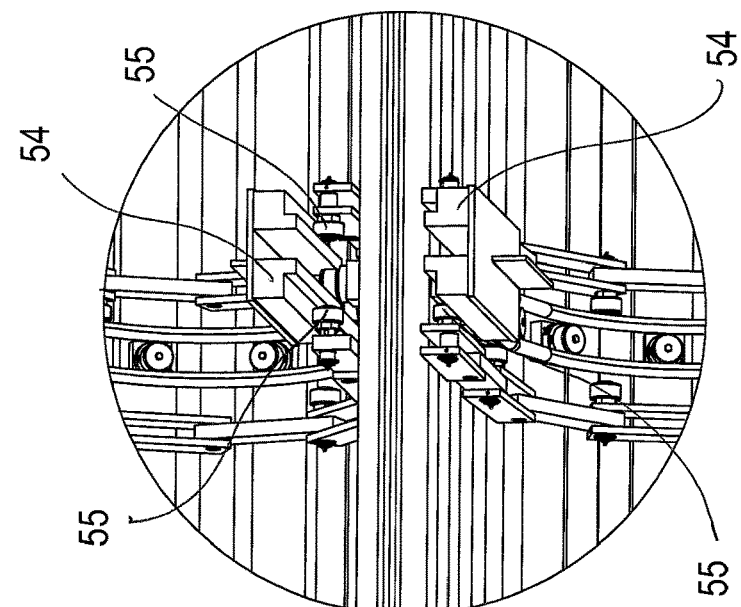
Figure 56:
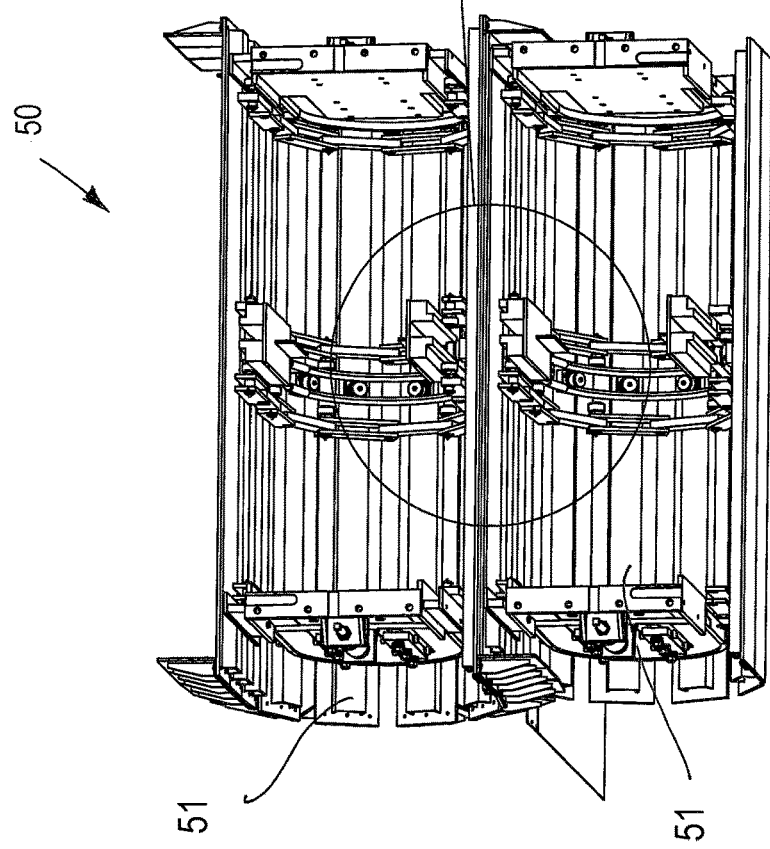

FIG. 43 is a perspective view of another simplified form of the dispensing device according to the invention, having a segment or slice shape, with the outlet slit section, or front, extending according to an arc of a circle, FIG. 44 is a front view of the dispensing device in FIG. 43;

FIG. 45 is a section taken along the line XLV-XLV in FIG. 44;

FIG. 46 is a top view of the segment-shaped dispensing device having its front in the form of an arc of a circle;

Figures from 47 to 49 show the dispensing device which is cut at three curved surfaces extending according to three related radii of different lengths, having their centers close to the mixture-inlet section of the device;

FIG. 50 shows a dual dispensing device according to a preferred embodiment of the invention, and designed to be fed by a single mixing head;

FIG. 51 is a front view partially showing an apparatus for foaming panels comprising a plurality of pairs of dispensing devices, each pair being associated with a respective mixing head;

FIG. 52 shows a possible alternative embodiment of the apparatus providing three dispensing devices arranged side-by-side, each dispensing device being fed by a respective mixing head;

FIG. 53 is an interrupted side view of the apparatus according to the invention;

FIG. 54 is a view from above of the part of the apparatus comprising the dispensing devices according to the invention;

FIG. 55 is a view of a dual conveyor defined by plate or slab members, forming part of the apparatus according to the invention;

FIG. 56 is an interrupted perspective view, shown from the inside, of the dual conveyor comprising the plate or slab members;

FIG. 57 shows a magnified detail of FIG. 47 showing wheel thrust units;

FIG. 58 is a cross section of the dual conveyor according to the invention;

FIGS. 59 and 60 are two magnified details of FIG. 58, showing dragging bearings engaging with screw driving means and wheel thrust units supporting and counteracting the thrust of the expanding foam.

FIG. 61 is a view similar to FIG. 58, and yet relating to a second alternative embodiment of the dual conveyor according to the invention;

FIGS. 62 and 63 are magnified details of FIG. 61, showing the supporting and counteracting wheel thrust units inversely oriented compared to the alternative embodiment in FIG. 58;

Figures from 64 to 68 are different views of a plate or slab member, showing a central wheel dragging bearing wheel and thrust wheel units cantilever-mounted on single-plate portions and on dual-plate portions, respectively, adapted to be jointly connected with adjacent plate or slab members;

FIG. 69 schematically shows the deflection minimising effect of a plate/slab member which is achievable owing to the lever configuration of the single-plate and dual-plate portions equipped with wheel thrust units.

FIG. 70 is a diagram showing a bending curve (minimum deformation) with reference to a (right-side) half of a plate/slab member according to the invention.

DETAILED DESCRIPTION OF THE INVENTION

With reference to the accompanying drawings, there is described a device 1 according to the invention for dispensing and distributing a reactive mixture, and an apparatus 100 provided with a plurality of said devices 1, for continuously foaming a panel.

The apparatus 100 comprises supporting means 101, such as a supporting bench or table, for a substrate 2 to be foamed, e.g., a paper web or any other desired web material that is run along an advancement direction $D_A$. The dispensing and distributing devices 1 are aligned side by side, transversely to the advancement direction $D_A$. A plurality of single dispensing devices 1, for example 3 or 4 devices arranged side by side, is also possible, each of them being fed by a respective mixing head. In an alternative arrangement, the dispensing devices 1 are coupled in pairs, each pair being fed by a respective common mixing head.

A dispensing station E is provided close to the supporting bench or table 101, to apply a thin, uniform film of mixture along the entire width W of the said relatively moving substrate.

Specifically, the dispensing station E is configured to dispense the resin continuously over time, for processes lasting more than 30 minutes, without any interruption.

Said dispensing station E comprises a line arrangement formed either by pairs C1, C2, C3, . . . , Cn of dispensing devices 1 (as shown in FIG. 51, for example) or by single dispensing devices individually fed in a dedicated manner by a respective mixing head (as shown in FIG. 52).

The dispensing station E comprises a limited number of mixing heads 102 and dispensing devices 1, depending on the liquid polyurethane mixture M deposit width.

Each dispensing device or pair of dispensing devices 1 is fed by a respective mixing head 102, and the two dispensing devices 1 of each pair are connected to the ends of a common feeding duct 103 arranged transversely to the advancement direction $D_A$ of the web material 2.

The dispensing devices 1, fed either individually or in pairs, are arranged in line in such a way that they cover a width W of the substrate 2 that may vary from 1180 mm to 3000 mm, in order to obtain panels having a width of from 1180 mm to 2660 mm. Indeed, the initial width of the substrate 2 may be greater than the width of the finished panel, and the longitudinal edges protruding laterally may be either progressively unwrapped again or removed at the end of the foaming process.

Downstream of the supporting bench 101 there is provided a dual conveyor 50 comprising a plurality of mutually articulated plate or slab members 51 arranged so as to support and advance—while forming it—the panel progressively obtained through the foaming process of the web material 2 along the advancement direction $D_A$, and to counteract the thrust of the expanding foam and form it.

The structural and functional configuration of the dual conveyor 50, and especially of the plate or slab members 51 shall be described in more detail later.

There is now described in detail the device 1 for dispensing and distributing a liquid mixture M.

The mixture M is generated by combining chemically reactive component resins, with the addition of an expanding agent in solution. The reagent resins used are highly reactive, and have a gel time of less than 36 seconds.

The dispensing and distributing device 1 is described and illustrated below both in its segment-shaped simplified form, with the front in the form of an "arc of a circle", and with flat inner surfaces for conveying and containing the resin (shown in Figures from 43 to 49), and in its ameliorative form in the shape of a "flattened segment", i.e., with a substantially straight front, and with flat, corrugated inner surfaces for conveying and containing the resin (shown in Figures from 2a to 41, for example).

The dispensing and distributing device 1 is adapted to be connected onto the outlet section of a mixing head, whereby this may have either a linear or an "L-shaped" configuration.

The reactive mixture flow exiting from the mixing head may be either laminar or chaotic, but usually has a circular shape, may be delivered at a given pressure, may include gases dissolved or liquefied as a result of the pressure, or finely dispersed, and may also contain dispersed charge particles or nano particles ("fillers").

The dispensing and distributing device 1 comprises an inlet section $S_i$ for receiving the aforementioned liquid polyurethane mixture M, and a planar-shaped outlet slit section $S_u$ adapted to be arranged transversely to the advancement direction $D_A$ of the paper or other material web 2.

The outlet slit section $S_u$ is geometrically shaped so as to dispense the mixture M with a reduced thickness, and to deposit a thin, uniform film of mixture onto the paper web 2.

The dispensing and distributing device 1 is defined by an upper valve element 3A and a lower valve element 3B, mutually coupled, comprising a first conveying and containing surface 4A and a second conveying and containing surface 4B, respectively. The first conveying and containing surface 4A and the second conveying and containing surface 4B face each other and are spaced apart so as to define a gap chamber I for the distribution and advancement of the mixture M from the inlet section $S_i$ to the outlet slit section $S_u$. The gap chamber 1 is shaped with a transverse section varying in a diverging manner from the inlet section $S_i$ to the outlet slit section $S_u$.

In the case of the dispensing and distributing device 1 with the linear exit front ("flattened-segment" shape), the first conveying and containing surface 4A and the second conveying and containing surface 4B have geometric shapes complementary to each other, and are spatially shaped so as to define respective paths $p_0, p_1, \ldots, p_{n/2}, \ldots, p_n$ for the various fractions of a mixture M, these paths individually radiating in a uniformly diverging manner, from the inlet section $S_i$ to a respective equidistant area $z_1, z_2, \ldots, z_{n/2}, \ldots, z_n$ of the substantially straight outlet slit section $S_u$, wherein these paths $p_0, p_1, \ldots p_{n/2}, \ldots, p_n$ (shown in FIG. 1C) are all of the same length in extension, so as to impose equal distances that are traveled in equal times: this configuration prevents the formation—along the path from the inlet section $S_i$ to the outlet slit section $S_u$—of zones requiring higher travelling times for the resin, with the consequent undesired formation of dishomogeneous layers of reacted resins on the surfaces, suitable for causing the dishomogeneity of the exiting film.

Basically, the average speeds along each section—this comprising zones equally distant from the inlet section $S_i$ and from the outlet slit section $S_u$—are kept equal. In the case of the "flattened-segment" dispensing and distributing device 1, in consideration of the flattened geometric structure of the exit front, the condition of equality of the said paths $p_0, p_1, \ldots p_{n/2}, \ldots, p_n$ is guaranteed thanks to the special corrugated shape of the conveying and containing surfaces 4A, 4B, this corrugated shape being more evident in the central region of the device, and is progressively reduced towards the side zones.

By contrast, in the simplified form of the dispensing and distributing device 1 with the exit front in the shape of an arc of a circle (thus in the shape of a "NON-flattened segment") (shown in Figures from 43 to 49, for example), the inner surfaces for conveying and containing the resin are slightly concave, substantially in the form of a very flattened semi-ellipse, with a substantially flat longitudinal section, and the said substantially linear, non-corrugated paths for the resin are all of the same length, as they connect the inlet section $S_i$ to the outlet slit section $S_u$ extending in the form of an arc of a circle, and have their centers substantially arranged in said inlet section $S_i$. As visible in Figures from 46 to 49, the gap 1, delimited by the conveying and containing surfaces for the resin, has a geometric shape that progressively diminishes in height, while extending in width. This allows to keep constant the total passage area calculated on each section traced along the points arranged all at the same distance from the inlet section $S_i$.

As to the dispensing and distributing device 1 in the shape of a "flattened segment", the chart shown in Figure illustrates how the area comprising the total sections for the passage of the resin may vary linearly depending on the distance from the entrance, along the paths radiating between the inlet section and the outlet slit section.

The shape of the conveying and containing surfaces 4A and 4B is described in more detail below.

The first conveying and containing surface 4A and the second conveying and containing surface 4B feature corrugated or zigzag contours complementary to each other—according to planes intersecting the inlet section $S_i$ and the outlet slit section $S_u$—, each corrugated or zigzag contour having a crest or peak width varying depending on the intersecting plane (going from the inlet section $S_i$ to the outlet slit section $S_u$ under consideration), as best seen in FIG. 1C. The width of the path contours is maximum where there is a longitudinal midline plane $P_{Zn/2}$ of the dispensing and distributing device 1, and progressively decreases up to a minimum value (straight line), at the planes, $P_{z0}$, $P_{zn}$ passing through the end zones $Z_0$, $Z_n$ of the outlet slit section $S_u$, as shown schematically also in FIG. 1C.

According to this configuration, the said paths $p_0$, $p_1$, ... $p_{n/2}$, ..., $p_n$ followed by the various fractions of mixture M, extend from the inlet section $S_i$ to the outlet slit section $S_u$, according to radial diverging lines having all the same extension length.

In other words, the gap I for the passage and distribution of the mixture M turns out to be delimited by surfaces having corrugated folds that allow to reduce the plan distance between the inlet section $S_i$ and the outlet slit section $S_u$, whereby said folds become progressively flattened until they disappear as they approach the side edges of the device 1, so as to feature a straight front, or a front with reduced curvature on the outlet slit section $S_u$. By the terms "flattened" or planar or "straight" in shape, referred to the front or to the outlet slit section, it is understood that this geometric condition is met by taking into account certain margins of dimensional tolerance. Basically, the exit front may be considered "straight" or "flattened" as long as it extends over its length l and remains within a cylindrical virtual area having a given radius R, where R≤0.12l.

Figures from 2 to 8 clearly show the corrugated geometry of the valve elements 3A, 3B. Figures from 30 to 41, by contrast, show the course of the gap I, this having sections that vary linearly depending on the distance from the entrance, between the inlet section $S_i$ and the outlet slit section $S_u$.

There is highlighted a significant difference in comparison with the state-of-the-art distributors (shown in FIGS. 1A and 1B): in the latter there is the dispensing of a mixture featuring different "ages" (travelling times) different from one area to another; specifically, the resin turns out to be older and at a more advanced reaction stage in the end zones of the dispenser, since the path followed was longer than the one in the central area.

In an embodiment, the gap chamber I has a thickness T, defined by the distance between the two said conveying and containing surfaces 4A, 4B, this remaining constant from the inlet section $S_i$ to the slit section $S_u$.

In another embodiment of the device 1, the gap chamber I has a thickness T growing linearly from the inlet section $S_i$ to the outlet slit section $S_u$, depending on the distance along the trajectories diverging from the inlet section $S_i$, wherein the variation in thickness has been designed to control the expansion of the mixture M.

In another embodiment of the device 1, the gap chamber I has a thickness T linearly decreasing from the entrance to the exit, i.e., the distance between the two conveying and containing surfaces 4A, 4B diminishes—when passing from the inlet section $S_i$ to the outlet slit section $S_u$, depending on the distance along the trajectories diverging from the inlet section, so as to control the release when expanding agents are used to produce a "frothing" effect.

Figure 2A:
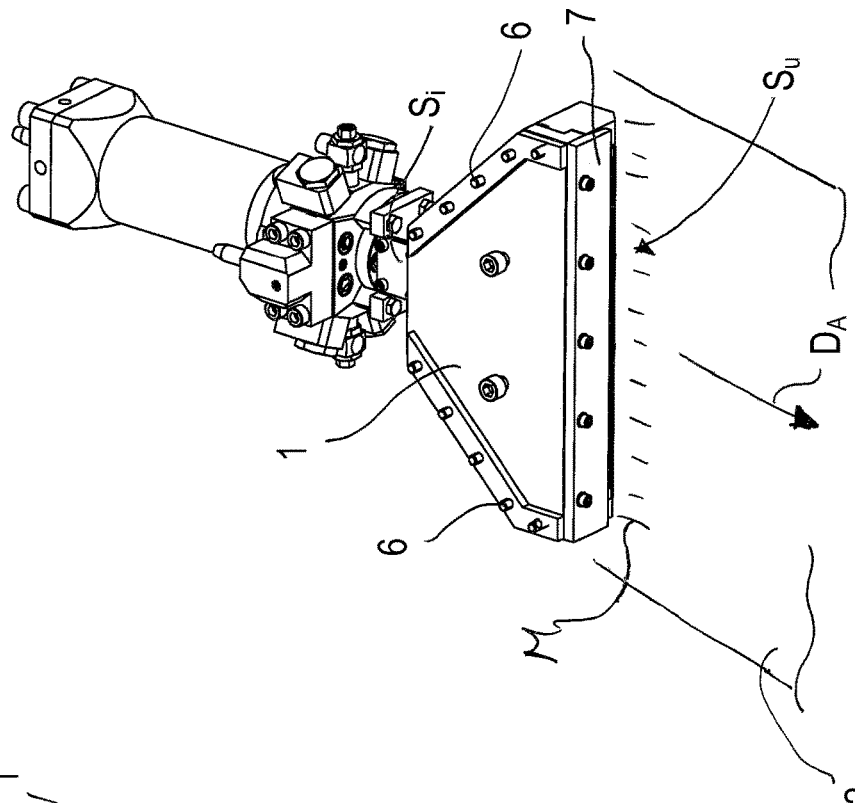
FIG. 2A is a perspective overview of a dispensing device according to the invention, with an associated mixing head.
Figure 2B:
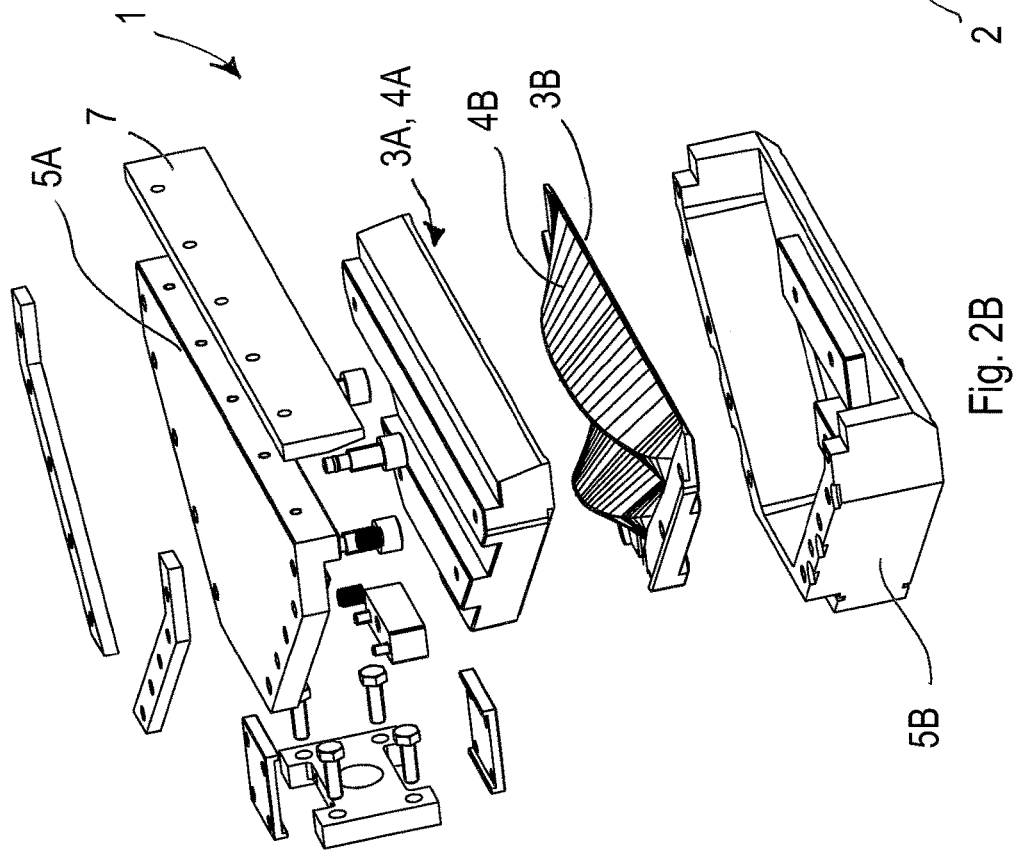
FIG. 2B is an exploded view of the dispensing device according to the invention.
Figure 3:
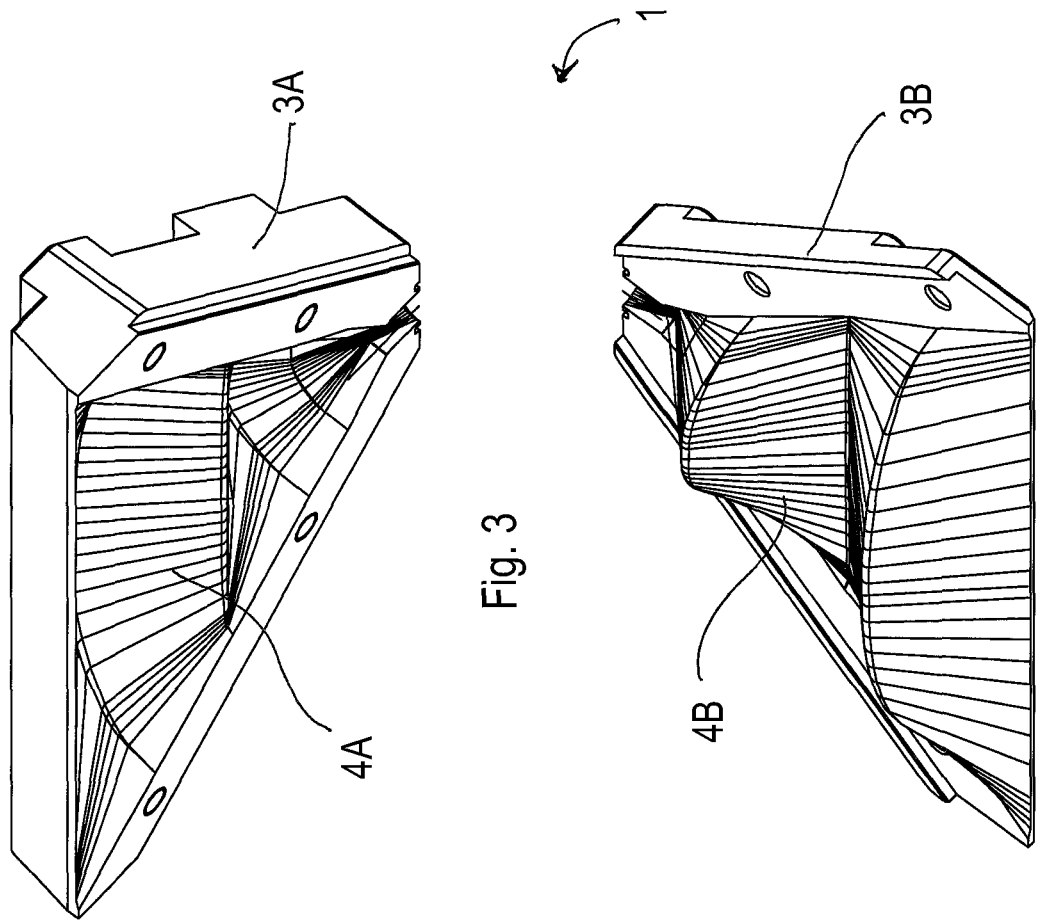
FIG. 3 shows two separate valve members, an upper member and a lower member, provided in the dispensing device according to the invention.
Figure 4:
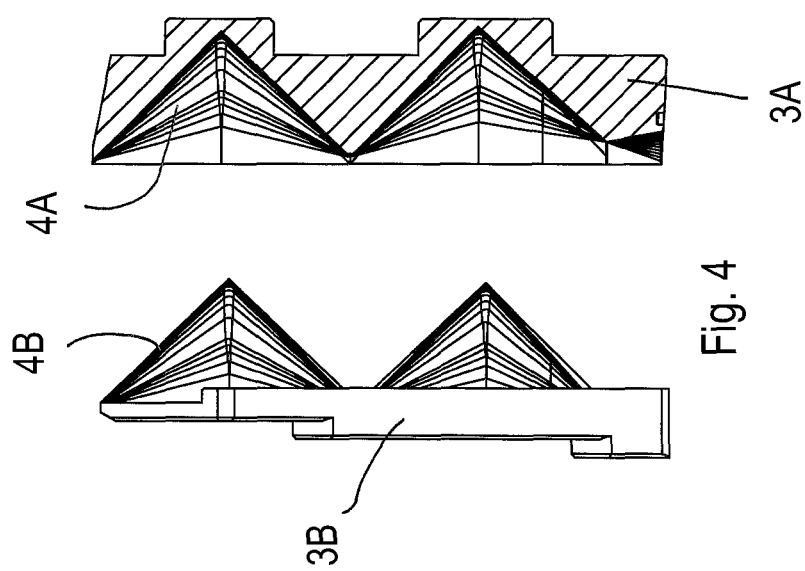
FIG. 4 is a side view of the lower valve member and a longitudinal sectional view of the upper valve.

The first and second valve elements 3A, 3B are enclosed in respective semi-enclosure elements 5A, 5B (shown in FIG. 2B) that are mutually coupled by clamping means 6.

The dispensing and distributing device 1 further comprises a front wall 7 which is flat at the outlet slit section $S_u$, designed to adjust the inclination of the front or outlet plane of the mixture M between 0° and 60° (see FIG. 35), by means of calibrated shims.

The geometric structures of the first and second valve elements 3A, 3B, with their corrugated structures, are of paramount importance for the correct distribution and dispensing of the mixture, and to avoid the formation of blocks of reacted, solidified mixture. For this reason, it is possible to obtain the first and second valve elements 3A 3B by directly using a mathematical model for the geometric shape—calculated by using the Finite Element Method (FEM)—that is processed with 3D CAD to obtain the complete, three-dimensional profiles.

Once the valve elements 3A, 3B have been obtained, for example by three-dimensional moulding, they are movably housed within the semi-enclosure elements 5A, 5B that define a solid, box-like housing structure in steel or aluminium, so as to withstand stresses and deformations resulting from a possible inner pressure of the mixture M, up to 30 bar.

Thanks to the process for obtaining objects, for example through 3D printing techniques, for the valve elements 3A, 3B there are obtained surfaces faithfully reflecting the mathematical model developed in the fluid dynamic simulation, and very smooth (preventing the occurrence of "build-up" phenomena), and not requiring any further tool machining. Furthermore, 3D printing allows a three-dimensional adjustment both of the distance T and of the shape of the waves, between the inner surfaces 4A and 4B of the valve elements 3A 3B depending on the desired flow rates and pressure drops to be set for the foaming process.

The first and second valve elements 3A, 3B, owing to the fact that they are housed in a releasable way in the said semi-enclosure elements 5A, 5B, allows them to be easily removed so as to quickly replace them periodically with new, already moulded valve elements.

All drawbacks mentioned in the introductory section on the state of the art are solved by the dispensing and distributing device 1 according to the invention.

The definition of the device 1 as described above has required massive analysis and design efforts, many experimental tests have been conducted, and different distributor geometries have been studied. In particular, before reaching the current "flattened-segment" shape (also referred to as "flattened duck beak" shape), there had been first developed and tested the segment-shaped dispensing device with the exit front in the form of an arc of a circle, described above, this being the device from which the present improved embodiment of the "flattened front" device stems from. Such a non-flattened "duckbeak" distributor prototype was meant to solve the drawbacks of bar distributors, especially the problem of the different lengths of path followed by the different mixture fractions, by implementing a distribution channel having progressive sections featuring contours in the form of an arc of circle, so as to keep constant the distance between the point where the resin is introduced in the distributor and the outlet section. Moreover, said distributor had been examined with a fluid-dynamic simulation, in order to obtain a uniform distribution of speeds, at equal radial distances from the inlet point, and to avoid the occurrence of conditions of instability along the feeding sections of the slit characterised by the formation both of zones with preferential accumulations "build-ups" of reagent material) and of preferential zones for the passage of the reagent resin—also undesired. Nevertheless, though said distributor achieved significantly improved results as compared to conventional distributors, there were some drawbacks; specifically, when the dispensing device with the front in the shape of an arc of a circle was in vertical position, the delivered flat, laminar film flow contracted during the fall, due to the surface tension of the film and to its front projection according to the sinus of the half-angle before coming into contact with the sheet-shaped substrate to be wetted and foamed. When positioned horizontally, the laminar film delivered was in the shape of an arc of a circle, such that the thickness of the film delivered was not uniform along the moving substrate, as its projection was proportional to the sinus of the half-arc angle. Yet, a possible mitigation of said drawback or the extension of the width of the said prototype by increasing the radius of the segment, i.e., of the arc of circle of the exit front, would have resulted in the disadvantage of having paths too long for the mixture, and thus long residence times of the mixture within the distributor.

All drawbacks related to the above-described prototype with the front in the shape of an "arc of a circle" have been solved by the present dispensing and distributing device 1 in the shape of a "flattened segment" which basically is based on a similar functioning principle, and yet uses an outlet section $S_u$ capable of delivering a straight mixture front, like the "bar" distributor. Unlike the known bar distributor, however, this allows to grant the same travel time for all the mixture fractions at the exit, thanks to the equal lengths of all paths according to uniformly diverging directions, while avoiding the occurrence of film "contraction" phenomena—whereas these were present in the previous prototype with the half-circular front (free of internal undulations)—and avoiding the occurrence of a dishomogeneous distribution along the slit projection.

The present dispensing and distributing device 1 achieves surprising results both because of the effective control of gas expansion when gases pass from an environment under pressure to an environment at atmospheric pressure, and because of the obtained thin, uniform film having the same width as the slit, to be deposited onto the moving web material.

There will now be described the dual conveyor 50, and more specifically the plate or slab members 51 forming it, with which it is possible and advantageous to synergistically couple one or more flattened segment-shaped dispensers arranged in line.

Each plate/slab member 51 comprises either a box-like structure or reinforcing ribs for the plate intended to get in contact with the web material 2. The plate/slab member 51 is provided with wheel dragging means 53, especially pin members onto which are mounted wheels equipped with special bearings. The wheel means 53 protrude transversely, according to a lying orientation in a vertical plane, so as to engage a respective homokinetic, central screw driving device 52, to be drawn along the advancement direction $D_A$. The homokinetic screw drive 51 engages a number of wheel means 53 of the respective plate/slab members 51 on subsequent threads at the same time, whereby this ensures a uniform, smooth advancement, free of any unevenness or speed pulse, thus resulting in a correct advancement of the substrate 2, and, advantageously, in a greater uniformity in the foaming process.

For each of the upper and lower conveyors, the dual conveyor 50 comprises a pair of rail elements 54 extending along the advancement direction $D_A$ and arranged so as to laterally guide the wheel dragging means 53, and to act as resting surfaces for any additional wheel thrust means 55 as described below.

Therefore, the rail elements 54 interact with the central wheel dragging means 53, and act so as to minimise any transversal movements of the plate/slab members 51.

With reference to Figures from 56 to 69, the dual conveyor 50 comprises thrust units, in particular thrust bearing wheels 55 (specifically wheel members provided with bearings), arranged close both to the central area and to the side zones of each plate/slab member 51, and designed to provide a supporting action and to counteract the thrust of the expanding foam. In the central area, the thrust bearing wheels 55 abut against the rail elements 54, as better shown in FIGS. 58, 59, 60, whereas the side thrust bearing wheels 55 slide in contact along additional resting and thrust members arranged at the sides of the plate/slab members 51.

In an embodiment, the thrust bearing wheels or units 55 are cantilever-mounted on respective plate/slab members 51 in an appropriate manner, so as to define respective lever arms B, properly designed to produce moments $M_f$ counterbalancing the curvature of the respective plate or slab members 51. This structural configuration produces the effect of minimising the deflection f of the various portions of the plate or slab members 51 subjected to the thrust of the expanding foam, as schematically shown in FIG. 69.

It is observed that the configuration of the plate/slab members 51 with thrust bearing units 55 located both at the center and at the ends thereof, the lengths of said members may be far greater than those of the state-of-the-art plate members.

Specifically, where the length of a state-of-the-art plate member does not exceed 1300 mm or slightly, the length of the plate/slab member 51 according to the invention is at least 2520 mm, i.e., substantially twice the length of the prior art member.

The positions of the thrust bearing units 55, and specifically of the thrust bearing units 55 arranged towards the ends of the plate/slab member 51, is selected appropriately so as to minimise the bending curve (deformation) of the plate/slab member 51, when the latter is subjected to the expanding pressure of the foam, according to the calculations made by applying the formula developed to this end, outlined below. FIG. 70 illustrates the bending curve 60 calculated with regard to a (right-side) half of the plate/slab member 51, as the curve of the other half is symmetrical with the midline of the plate/slab member 51.

Measurements were carried out on some plate/slab members 51 equipped with load cells arranged in appropriate sections, and it was found that normally, the thrust of the foam is symmetrical and almost uniform (with a slight decrease at the opposite ends).

The pressure of the foam may vary from 0.5 newton/cm$^2$ to 4.5 newton/cm$^2$, depending on mixture formulation, speed of the dual conveyor 50 and thickness of the panel to be foamed. The most likely pressure value is approximately 1.5 N/cm$^2$. Therefore, the deformation of the plate/slab member 51, caused by the pressure of the reacting foam, derives from the almost uniformly distributed load exerted by the foam both on the lower plate/slab member 51 and on the upper plate/slab member 51.

With reference to FIGS. 69 and 70, L1 is the distance of the lateral thrust bearing unit 55 from the final edge of the plate/slab member 51 (i.e., the length of the part of the slab member 51 remaining cantilever), L2 is the distance of said thrust bearing unit 55 from the midline of the plate/slab member 51, L is the half-length of the latter. In a position of the thrust bearing units 55—acting as symmetrical side supports—the deflection of the slab member under pressure is minimised. Such deflection corresponds to the condition where the deflection of the L2 section is equal to the deflection of the L1 section.

The equation minimising the deformation is a function of the ratio $\alpha=L1/L2$, i.e., the ratio between the half-length L of the slab member 51 and the length of the cantilever section L1.

The best ratio is obtained with the application of the aforementioned condition of equality.

Where Z stands for the varying distance from the side support to the midline, $\alpha=L1/L2$ and $X=Z/L2$, we have:

$$6\alpha^3-\alpha+6\alpha^4=2x^4-3x^3(1+2\alpha^2)+12x^2\alpha^2-6\alpha^2x+x$$

whereby the root—appropriately solved, simplified and approximated—is $\alpha=(12^{\sqrt{21}-53})/5$, this leading to $\beta=L1/L=(8-\sqrt{21})/12$ Therefore, there is imposed a position of the side supports according to which the L1/L ratio shall be within the following values:

$$0.75\times(8-\sqrt{21})/12 \leq L1/L \leq 1.25\times(8-\sqrt{21})/12$$

As already mentioned, load cells may be provided along the plate member 51, these being arranged to detect the values of the pressure exerted by the thrust of the expanding foam.

Plate/slab members 51 are structurally designed to be rotatably linked together, each of them comprising single-plate portions 56 and dual-plate portions 57, onto which the aforesaid thrust bearing units 55 are transversely mounted.

In the exemplary embodiments shown and described, each plate/slab member 51 comprises—on a first half M1, two single-plate portions 56, one being arranged close to the central area and another one being closer to the end of the member 51; on a second half M2 of the plate/slab member 51 there are provided two dual-plate portions 57, whereby as in the case of the single plates 56, one is arranged closer to the central area, and one is arranged more externally, as shown in Figures from 64 to 68.

Further, the thrust bearing units 55 may feature an alternated orientation with respect to each other, and may be equipped with cantilever arms of at least 35 mm in length, or, in any case, of adequate length according to the geometry and dimensioning of the plate/slab member 51, so as to produce counterbalancing moments opposed to each other, and acting so as to further reduce the deformation of the respective sections of the plate/slab member 51.

In the Figures from 56 to 60, the thrust bearing units are oriented following a first alternate sequence that allows to use the two central tracks 54 as guide and thrust means, respectively, with significant cost savings, whereas in the embodiment illustrated in Figures from 61 to 63 the thrust bearing units 55 are inversely oriented with respect to the embodiment shown in FIG. 49, so as to better counteract the deformation of the plate/slab member 51, and thus reduce even more effectively the deflection f of the latter, to the benefit of the quality of the panel obtained by foaming.

The plate/slab members 51 follow each other in position that are rotated by 180 degrees with respect to each other, with respect to an orthogonal axis of symmetry.

In other words, each plate/slab member 51 is arranged with its first half M1 and its second half M2 in inversed positions with respect to the two immediately adjacent plate/slab members 51.

In this way, each single-plate portion 56 of a first plate or slab member 51 is rotatably connected, at a first end, with a dual-plate portion 57 of an adjacent second plate or slab member 51 arranged on one side, and, at a second opposite end, with an additional dual-plate portion 57 of an adjacent third plate or slab member 51 arranged on the opposite side.

In particular, the end of each single-plate portion 56 is received within the interspace that turns out to be defined in the respective dual-plate portion 57.

Similarly, each dual-plate portion 57 of the said first plate or slab member 51 is rotatably connected, at one end, with a single-plate portion 56 of the said second plate or slab member 51, and, at another end, with an additional single-plate portion 56 of the said third plate or slab member 51.

In the light of the above description, it is clear that unlike known systems, the foaming apparatus 100, and more specifically the dual conveyor 50, utilises the central guide tracks 54 both for the lateral guiding and to additionally support and counteract the thrust of the expanding foam, whereby otherwise the member 51 would be subjected to excessive deformation due to its significant length, or to a much more solid dimensioning, so as to limit the deformation.

Each plate/slab member 51 may also be tool machined so as to feature a pre-deformation, subsequently compensated—during the functioning—by the pressure of the expanding foam.

Where insulating panels having a width up to 1300 nm are intended to be obtained, the apparatus 100 will include a maximum of two mixing heads 102; Where insulating panels being substantially twice the width, and specifically having a width up to approximately 2660 mm are to be obtained, the apparatus 10 will include a maximum of four mixing heads 102, and specifically three mixing heads 102 in the case of the foaming of insulating panels having a width up to 2660 mm.

In any case, each mixing head 102 may feed one or maximum two dispensing devices 1 at a time.

In short, the apparatus 100 may deposit the expanding resin over a width that is twice the width provided in known devices, through a maximum of four heads with four flattened segment-shaped dispensers, or through a maximum of three mixing heads (or even two), whereby each of them is associated with a pair of dispensing and distributing devices 1 distributing a thin, uniform film over a width W that is twice the width of known systems.

The dispensing and distributing devices 1 may be used in combination with mixing heads and with related resin metering pumps that are already in use, thus allowing an extension of the resin distribution width.

In the light both of the above description and of the accompanying drawings, then, it is evident that the invention relates to a method and apparatus for continuously foaming a panel, that overcome the drawbacks of the state-of-the-art systems, and that allow to obtain panels having a width that is far greater than the known systems, while providing a uniform distribution of the resin, this resulting in a higher quality of the foamed product. The special geometrical and structural arrangement of the dispensing device 1 allows to achieve a uniform foaming of very wide panels by means of a limited number of mixing heads 102 and dispensing devices 1.

The above specification and the accompanying drawings are illustrative of the innovative features of the dispensing and distributing device 1 and of the foaming apparatus 100; other modifications may be made to the device and to the apparatus 100, or to parts thereof, without departing from the claims.

In practice, materials may be selected appropriately depending on the requirements to be met and on the state of the art available, provided that they turn out to be compatible with the specific use and with the respective individual components for which they are intended.

It is possible to arrange and dimension the dispensing and distributing device 1 and the apparatus 100, and to implement materials, according to the needs, and modifications and/or/additions may be made to what has been described above and illustrated in the accompanying drawings.

What we claim is:

1. An apparatus for foaming a panel, comprising:
    supporting means for supporting a substrate to be foamed;
    a dispensing station for depositing, continuously over time, for processes lasting more than 30 minutes without any interruption, along a transverse section with respect to an intended advancement direction of a substrate, a series of thin, uniform films of reagent resins that are highly reactive and have a gel time of less than 36 seconds, said thin, said dispensing station be configured for arranging uniform films side by side so as to cover with expansion of a foam an entire width of substrate;
    wherein said dispensing station includes at least one dispensing for dispensing a liquid polyurethane mixture, the at least one dispensing device being fed by a respective mixing head;
    the at least one dispensing device including an inlet section suitable for receiving a liquid mixture generated by a combination of chemically reactive component resins with an addition of an expanding agent and solid powder charges, nano charges, or emulsifying gases; an outlet slit section arranged transversely to said advancement direction and configured to dispense a thin, uniform film of said liquid mixture having a width corresponding to an extension of said outlet slit section; an upper valve element and a lower valve element, mutually coupled and having a first conveying and containing surface and a second conveying and containing surface, respectively, facing each other and being spaced apart so as to define a gap chamber for distribution and advancement of the liquid mixture from said inlet section to said outlet slit section, said gap chamber being shaped in a diverging manner from said inlet section until it reaches a same width as said outlet slit section;
    wherein said first conveying and containing surface and second conveying and containing surface have geometric shapes complementary to each other, and are spatially shaped so as to define, for various fractions of said mixture, respective paths radiating from the respective inlet section to respective equidistant zones of said outlet slit section, wherein said paths all having a same extension length, so that all fractions of the liquid mixture will travel equal distances from the inlet section to the outlet slit section, in equal times, maintaining equal average speeds along each section having zones placed all at a same path distance either from the inlet section or from the outlet slit section, so as to inhibit formation of dishomogeneous layers of reacted resins, with a consequent dishomogeneity of the exiting film;
    said apparatus including:
    a dual conveyor having a plurality of mutually articulated plate or slab members, arranged to support and advance, along said advancement direction, a panel progressively obtained through foaming of said substrate, and arranged to counteract a thrust of expanding foam;
    wherein said plate or slab members include:
    wheel dragging means lying on a vertical plane, protruding to engage with central screw driving means, to be drawn along said advancement direction; and
    rail elements extending along said advancement direction, and arranged so as to laterally guide said wheel dragging means, while supporting a thrust of the foam in a central area of the structure of a dual conveyor; and
    thrust bearing wheel units arranged close to a central zone and to side zones of each plate or slab member, and configured to act as supports and to counteract thrust from expanding foam as well as to limit a deflection of several sections of each respective plate or slab member to a minimum.

2. An apparatus according to claim 1, wherein said plate or slab members have a length configured to support a substrate having a width ranging from 1180 to 3000 mm, and to allow foaming of panels having a width that may vary from 1180 to 2660 mm, said apparatus comprising:
    a maximum of two mixing heads where insulating panels having a width up to 1300 nm are intended to be obtained; or
    a maximum of four mixing heads, where a foaming is to be of insulating panels having a width up to 2660 mm, each mixing head feeding a single dispensing device.

3. An apparatus according to claim 1, wherein the thrust bearing wheel units nearest ends of the respective plate or slab members are arranged at a distance from respective end edges of said plate or slab members so as to minimise deflection of said plate or slab members, wherein a ratio between said distance and the half-length of said plate/slab member is such as to satisfy the following relation:

$$0.75 \times (8-\sqrt{21})/12 \leq L1/L \leq 1.25 \times (8-\sqrt{21})/12,$$

wherein L1 is the distance of the lateral thrust bearing unit from the final edge of the plate or slab member and L is the half length of the plate or slab member.

4. An apparatus according to claim 1, wherein each plate or slab member comprises:
    two or more single-plate portions distributed on a first half, and two dual-plate portions distributed on a second half opposite said first half with respect to an axis of symmetry that is orthogonal to said plate or slab member, wherein each plate or slab member is arranged with the first half and second half in reversed positions with respect to two immediately adjacent mutually articulated plate or slab members.

5. An apparatus according to claim 1, wherein said thrust bearing wheel units are oriented in an alternated manner with respect to one another, to produce counterbalancing moments opposed to one another, and arranged to oppose a curvature of the respective plate or slab member caused by a thrust of the expanding mixture during operation.

6. An apparatus according to claim 1, wherein each dispensing device has an outlet slit section, of a length, having a linear or substantially linear shape that remains within a virtual cylindrical area having a radius R≤0.12×l, wherein "l" is the total length of the outlet slit section, and wherein said first conveying and containing surface and said second conveying and containing surface have corrugated or zigzag contours which are complementary to each other according to planes intersecting said inlet section and said outlet slit section, each corrugated or zigzag contour having a crest or peak width varying depending on said planes going from said inlet section to said outlet slit section, a width of the contour being maximum where there is a longitudinal midline plane of said dispensing device and progressively decreasing up to a minimum value, at the planes passing through end zones of said outlet slit section, such that said paths extend from said inlet section to said outlet slit section having a flat front, all with a same extension length so as to have equal travelling times for the reactive resin, and to inhibit accumulation of deposits of reacted layers having dishomogeneous thicknesses on surfaces from the inlet section to the outlet slit section.

7. An apparatus according to claim 1, wherein said outlet slit section is developed into an arc of a circle, and wherein said first conveying and containing surface and said second conveying and containing surface have contours, according to transversal planes, that are slightly concave substantially forming a highly flattened semi-ellipse, with a contour that is substantially linear according a longitudinal section plane, to generate substantially linear paths for the resin, having all a same length between the inlet section and the outlet arc-of-circle shaped slit section, to have equal travelling times for the reactive resin, and to inhibit accumulation of deposits of reacted layers having dishomogeneous thicknesses on the surfaces going from the inlet section to the outlet slit section.

8. An apparatus according to claim 7, wherein said gap chamber has such distances between said two conveying and containing surfaces as to delimit passage sections, each defined by respective zones placed at a same path distance from said inlet section, that have an area that is kept constant from said inlet section to said slit section.

9. An apparatus according to claim 7, wherein said gap chamber has such distances between said two conveying and containing surfaces as to delimit passage sections, each defined by respective zones placed at a same path distance from said inlet section, that have an area linearly increasing from said inlet section to said slit section.

10. An apparatus according to claim 1, wherein said gap chamber has such distances between said two conveying and containing surfaces as to delimit passage sections, each defined by respective zones placed at the same path distance from said inlet section, that have an area linearly decreasing from said inlet section to said outlet slit section to control dispensing of low-boiling expanding agents and to control a frothing effect.

11. An apparatus according to claim 1, wherein said first and second valve elements are 3D printed elements which are enclosed in respective semi-enclosure elements mutually coupled by clamping means, wherein said first and second valve elements are provided with reinforcing stepped zones for containing a thrust of internal pressure of the resin, and are housed in said semi-enclosure elements in a removable manner to facilitate a quick periodical replacement thereof.

12. An apparatus according to claim 1, comprising:
level and flat lips on the sides of valve elements and of respective semi-enclosure elements between said inlet section and said outlet slit section, to insert flat thickening laminas and calibrate the height of said outlet slit section for the mixture.

13. An apparatus according to claim 1, wherein a final gap portion reaching said outlet slit section has an inclination ranging from 0° to 60° with respect to a median plane (Pm) passing through said inlet section and said outlet slit section.

14. An apparatus according to claim 1, wherein the at least one dispensing device comprises a plurality of dispensing devices being aligned to one other transversely to the advancement direction of the substrate, each dispensing device being fed by a respective mixing head.

15. An apparatus according to claim 1, wherein the at least one pair of dispensing devices are aligned to one other transversely to the advancement direction, and wherein the at least one pair of dispensing devices are fed through a shared feeding duct by a respective common mixing head.

16. An apparatus according to claim 1, wherein said plate or slab members have a length configured to support a substrate having a width ranging from 1180 to 3000 mm, and to allow foaming of panels having a width that may vary from 1180 to 2660 mm, said apparatus comprising:
a maximum of two mixing heads where insulating panels having a width up to 1300 nm are intended to be obtained; or
a maximum of four mixing heads, where a foaming is to be of insulating panels having a width up to 2660 mm, each mixing head feeding two dispensing devices.

17. An apparatus according to claim 16, wherein said thrust bearing wheel units, provided with bearing elements, are cantilever-mounted on said single-plate portions and on said dual-plate portions so as to define a lever arm which produces a moment counterbalancing a curvature of the respective plate or slab member.

* * * * *